(12) United States Patent
Yamamoto et al.

(10) Patent No.: US 7,839,577 B2
(45) Date of Patent: Nov. 23, 2010

(54) ZOOM OPTICAL SYSTEM, OPTICAL INSTRUMENT INCORPORATING THE ZOOM OPTICAL SYSTEM, AND METHOD OF MANUFACTURING THE ZOOM OPTICAL SYSTEM

(75) Inventors: Hiroshi Yamamoto, Kawasaki (JP); Tomoki Ito, Kawasaki (JP); Satoshi Yamaguchi, Sagamihara (JP); Atsushi Shibayama, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/342,315

(22) Filed: Dec. 23, 2008

(65) Prior Publication Data

US 2009/0161227 A1 Jun. 25, 2009

(30) Foreign Application Priority Data

Dec. 25, 2007  (JP)  ............................. 2007-331480
Dec. 25, 2007  (JP)  ............................. 2007-331481

(51) Int. Cl.
    *G02B 15/14* (2006.01)
(52) U.S. Cl. ........................ 359/676; 359/683
(58) Field of Classification Search ................. 359/676, 359/683–685; 396/72–88; 348/240.99–240.3, 348/335–369
    See application file for complete search history.

(56) References Cited

U.S. PATENT DOCUMENTS

| | | | |
|---|---|---|---|
| 4,896,950 A | 1/1990 | Endo et al. | |
| 5,847,882 A | 12/1998 | Nakayama | |
| 6,025,962 A | 2/2000 | Suzuki | |
| 6,094,312 A | 7/2000 | Nakayama | |
| 6,483,648 B1 | 11/2002 | Yamanashi | |
| 6,985,303 B2 | 1/2006 | Takatsuki | |
| 6,999,240 B2 | 2/2006 | Yamada et al. | |
| 7,187,504 B2 | 3/2007 | Horiuchi | |
| 7,253,961 B2 | 8/2007 | Miyazawa | |
| 7,280,286 B2 | 10/2007 | Hayakawa | |
| 7,428,107 B2 * | 9/2008 | Nishimura | ................. 359/683 |
| 2005/0248669 A1 | 11/2005 | Iwasawa | |

FOREIGN PATENT DOCUMENTS

| | | |
|---|---|---|
| JP | 08-005913 A | 1/1996 |
| JP | 8-190051 A | 7/1996 |
| JP | 10-90601 A | 4/1998 |
| JP | 11-352402 A | 12/1999 |
| JP | 2001-228397 A | 8/2001 |
| JP | 2001-337272 A | 12/2001 |
| JP | 2002-131642 A | 5/2002 |
| JP | 2004-233750 A | 8/2004 |
| JP | 2005-134870 A | 5/2005 |
| JP | 2005-221949 A | 8/2005 |
| JP | 2007-219315 A | 8/2007 |

\* cited by examiner

*Primary Examiner*—Darryl J Collins
(74) *Attorney, Agent, or Firm*—Miles & Stockbridge P.C.

(57) ABSTRACT

A zoom optical system has a first lens group having a positive refracting power; a second lens group having a negative refracting power; a third lens group having a positive refracting power; a fourth lens group having a negative refracting power; and a fifth lens group having a positive refracting power, in the order from the object side. The fourth lens group is composed of a cemented lens of a negative lens and a positive lens in the order from the object side, and a condition of the following expression is satisfied: $\nu p > 30.0$, where $\nu p$ is an Abbe number of the positive lens.

33 Claims, 23 Drawing Sheets

CHROMATIC ABERRATION
OF MAGNIFICATION

COMA

COMA

COMA

CHROMATIC ABERRATION
OF MAGNIFICATION

COMA

ZOOM OPTICAL SYSTEM, OPTICAL INSTRUMENT INCORPORATING THE ZOOM OPTICAL SYSTEM, AND METHOD OF MANUFACTURING THE ZOOM OPTICAL SYSTEM

BACKGROUND OF THE INVENTION

1. Field of the Invention

The present invention relates to a zoom optical system, an optical instrument incorporating the zoom optical system, and a method of manufacturing the zoom optical system.

2. Related Background Art

There are hitherto-proposed zoom optical systems suitable for photographic cameras, digital still cameras, video cameras, and so forth (e.g., cf. Japanese Patent Applications Laid-open No. 8-190051 and Laid-open No. 2005-134870).

SUMMARY OF THE INVENTION

However, the conventional zoom optical systems had the problem that they failed to achieve good optical performance: e.g., they are not corrected well for aberration with image stabilization on.

The present invention has been accomplished in light of the problem and an object of the present invention is to provide a zoom optical system with good optical performance even with image stabilization on, an optical instrument incorporating the zoom optical system, and a method of manufacturing the zoom optical system.

For purposes of summarizing the invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessary achieving other advantages as may be taught or suggested herein.

In order to solve the above problem, a zoom optical system according to the present invention comprises, in the order from an object side: a first lens group having a positive refracting power; a second lens group having a negative refracting power; a third lens group having a positive refracting power; a fourth lens group having a negative refracting power; and a fifth lens group having a positive refracting power, and is configured as follows: the fourth lens group has a cemented lens of a negative lens and a positive lens in the order from the object side; and a condition of the following expression is satisfied: $vp>30.0$, where $vp$ is an Abbe number of the positive lens.

The zoom optical system is preferably configured as follows: the positive lens of the cemented lens has an object-side lens surface of a convex shape on the object side.

The zoom optical system is preferably configured as follows: at least a part of the fourth lens group is moved in a direction orthogonal to an optical axis.

The zoom optical system is preferably configured as follows: at least a part of the fourth lens group is moved in a direction orthogonal to an optical axis; and a condition of the following expression is satisfied: $1.0<f4/f2<3.0$, where $f2$ is a focal length of the second lens group and $f4$ is a focal length of the fourth lens group.

The zoom optical system is preferably configured as follows: a condition of the following expression is satisfied: $1.0<f5/(-f4)<2.0$, where $f4$ is a focal length of the fourth lens group and $f5$ is a focal length of the fifth lens group.

The zoom optical system is preferably configured as follows: a condition of the following expression is satisfied: $0.4<(-f2)/f3<0.9$, where $f2$ is a focal length of the second lens group and $f3$ is a focal length of the third lens group.

The zoom optical system is preferably configured as follows: a condition of the following expression is satisfied: $3.0<f1/(-f2)<6.9$, where $f1$ is a focal length of the first lens group and $f2$ is a focal length of the second lens group.

The zoom optical system is preferably configured as follows: a condition of the following expression is satisfied: $2.0<f1/f3<4.7$, where $f1$ is a focal length of the first lens group and $f3$ is a focal length of the third lens group.

The zoom optical system is preferably configured as follows: upon zooming from a wide-angle end state to a telephoto end state, a distance between the first lens group and the second lens group increases, a distance between the second lens group and the third lens group decreases, a distance between the third lens group and the fourth lens group increases, and a distance between the fourth lens group and the fifth lens group decreases.

The zoom optical system is preferably configured as follows: upon zooming from a wide-angle end state to a telephoto end state, the first lens group, the third lens group, and the fifth lens group move in a direction toward an object, and a moving distance of the third lens group and a moving distance of the fifth lens group are equal.

The zoom optical system is preferably configured as follows: the fourth lens group has a cemented lens of a negative lens and a positive lens in the order from the object side.

The zoom optical system is preferably configured as follows: only the cemented lens is moved in a direction orthogonal to the optical axis.

The zoom optical system is preferably configured as follows: a condition of the following expression is satisfied: $vp>30.0$, where $vp$ is an Abbe number of the positive lens of the cemented lens.

The zoom optical system is preferably configured as follows: a condition of the following expression is satisfied: $0.25<Rs/(-f4)<0.45$, where $Rs$ is a radius of curvature of a cemented surface of the cemented lens and $f4$ is a focal length of the fourth lens group.

The zoom optical system is preferably configured as follows: a condition of the following expression is satisfied: $0.07<Np-Nn<0.20$, where $Np$ is a d-line refractive index of the positive lens of the cemented lens and $Nn$ is a d-line refractive index of the negative lens of the cemented lens.

The zoom optical system is preferably configured as follows: a condition of the following expression is satisfied: $15<vn-vp<27$, where $vp$ is an Abbe number of the positive lens of the cemented lens and $vn$ is an Abbe number of the negative lens of the cemented lens.

The zoom optical system is preferably configured as follows: the cemented lens is comprised of a cemented lens of a biconcave lens and a positive meniscus lens with a convex surface on the object side in the order from the object side.

The zoom optical system is preferably configured as follows: at least one surface of a lens in the second lens group is formed in an aspherical shape.

An optical instrument according to the present invention comprises any one of the above-described zoom optical systems.

A method of manufacturing a zoom optical system according to the present invention comprises the steps of: arranging a first lens group having a positive refracting power, a second lens group having a negative refracting power, a third lens group having a positive refracting power, a fourth lens group having a negative refracting power, and a fifth lens group having a positive refracting power, in the order from an object side; and moving at least a part of the fourth lens group in a direction orthogonal to the optical axis to make correction for an image surface, wherein a condition of the following expression is satisfied: $1.0<f4/f2<3.0$, where f2 is a focal length of the second lens group and f4 is a focal length of the fourth lens group.

When the zoom optical system according to the present invention, the optical instrument incorporating the zoom optical system, and the zoom method of the zoom optical system are configured as described above, good optical performance is achieved even with image stabilization on.

DESCRIPTION OF THE PREFERRED EMBODIMENTS

Figure 1:
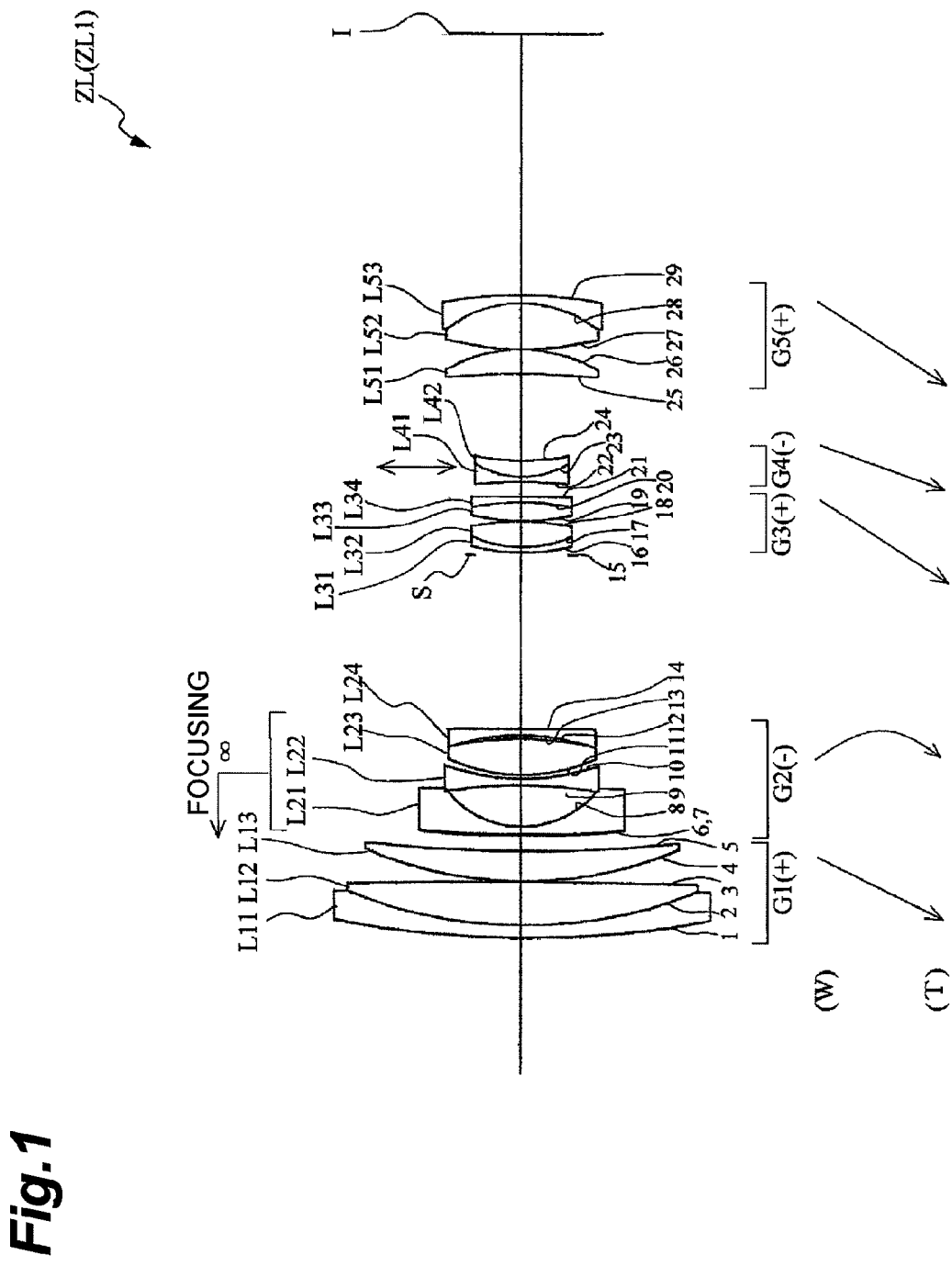
FIG. 1 is a sectional view showing a configuration of a zoom optical system according to the first embodiment.

The preferred embodiments of the present invention will be described below with reference to the drawings. As shown in FIG. 1, a zoom optical system ZL according to the present invention has a first lens group G1 having a positive refracting power, a second lens group G2 having a negative refracting power, a third lens group G3 having a positive refracting power, a fourth lens group G4 having a negative refracting power, and a fifth lens group having a positive refracting power, in the order from the object side, and, as indicated by arrows in the upper part in FIG. 1, it is configured to implement image stabilization by moving the fourth lens group G4 in directions orthogonal to the optical axis. This zoom optical system ZL shown in FIG. 1 corresponds to the first embodiment described later.

Since the fourth lens group G4 has the number of lenses smaller than the other lens groups and is thus easier to reduce the lens diameter, it is more suitable for incorporation of an image stabilization mechanism. This configuration permits the optical system to be corrected well for variation in aberration due to miniaturization of the lens barrel and the image stabilization.

This zoom optical system ZL is desirably configured so that, upon zooming with change in the lens position state from the wide-angle end state to the telephoto end state, the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases. This configuration ensures a predetermined zoom ratio while effectively correcting for variation in spherical aberration and curvature of field.

The zoom optical system ZL is desirably configured so that, upon zooming from the wide-angle end state to the telephoto end state, the first lens group G1, the third lens group G3, and the fifth lens group G5 move in the direction toward the object and a moving distance of the third lens group G3 and a moving distance of the fifth lens group G5 are equal. The configuration to move the first lens group G1 to the object side upon zooming from the wide-angle end state to the telephoto end state achieves implementation of reduction in the total length in the wide-angle end state and reduction in the effective diameter of the first lens group G1, and good correction for various aberrations together. When the third lens group G3 and the fifth lens group G5 are configured to move together in the direction toward the object, a part of the zoom function can be served by the lens groups from the third lens group G3 to the fifth lens group G5 and variation in aberration upon zooming can be well corrected for.

Furthermore, the configuration to equalize the moving distance of the third lens group G3 and the moving distance of the fifth lens group G5 upon zooming permits the third lens group G3 and the fifth lens group G5 to be integrally held. This structure suppresses change in mutual decentration of the third lens group G3 and the fifth lens group G5 upon zooming and therefore suppresses occurrence of decentration aberration, thereby achieving good imaging performance.

Now, let us explain conditions for construction of the zoom optical system ZL as described above. First, in the zoom optical system ZL the fourth lens group G4 is composed of a cemented lens of a negative lens and a positive lens with an object-side lens surface of a convex shape in the order from the object side and is configured to satisfy condition (1) below:

$$vp>30.0 \tag{1},$$

where vp is the Abbe number of the positive lens.

Condition (1) defines the Abbe number of the positive lens in the fourth lens group G4. When this condition (1) is satisfied, it is feasible to suppress decentration aberration in correction for the image surface with occurrence of camera shake and thus to achieve good imaging performance. If the Abbe number vp is smaller than the lower limit, the fourth lens group G4 will give rise to chromatic aberration so significant as to make correction difficult.

In the zoom optical system ZL the fourth lens group G4 is desirably configured to satisfy condition (2) below:

$$0.20<Rs/(-f4)<0.50 \tag{2},$$

where Rs is a radius of curvature of a cemented surface of the cemented lens and f4 is the focal length of the fourth lens group G4.

Condition (2) defines the radius of curvature of the cemented surface of the cemented lens to the focal length of the fourth lens group G4. If the ratio is outside the range between the upper limit and the lower limit of condition (2), it will become difficult to correct for spherical aberration and the decentration aberration will be too significant when the fourth lens group G4 is decentered for correction for the image surface with occurrence of camera shake. If the curvature of the cemented surface is too gentle (or if the radius of curvature Rs is too large), it will become difficult to correct for spherical aberration. The effect of the present invention can be made more certain by setting the lower limit and the upper limit of condition (2) to 0.25 and 0.40, respectively.

In the zoom optical system ZL the fourth lens group G4 is desirably configured to satisfy conditions (3) and (4) below:

$$0.000<Np-Nn<0.300 \tag{3};$$

$$15.0<vn-vp<40.0 \tag{4},$$

where Np is the d-line refractive index of the positive lens in the cemented lens constituting the fourth lens group G4, Nn the d-line refractive index of the negative lens, vn the Abbe number of the negative lens, and vp the Abbe number of the positive lens.

Condition (3) defines the difference between the refractive indices of the positive lens and the negative lens of the cemented lens constituting the fourth lens group G4. If the difference is outside the range between the upper limit and the lower limit of this condition (3), a tilt of the image surface will become too large to correct for when the fourth lens group G4 is decentered for correction for the image surface with occurrence of camera shake. The effect of the present invention can be made more certain by setting the lower limit and the upper limit of condition (3) to 0.005 and 0.200, respectively.

Condition (4) defines the difference between the Abbe numbers of the positive lens and the negative lens of the cemented lens constituting the fourth lens group G4. If the difference is outside the range between the upper limit and the lower limit of this condition (4), the fourth lens group G4 will give rise to chromatic aberration so significant as to make correction difficult. The effect of the present invention can be made more certain by setting the lower limit and the upper limit of condition (4) to 20.0 and 30.0, respectively.

The zoom optical system ZL is desirably configured to satisfy condition (5) below:

$$1.0<f5/(-f4)<2.0 \tag{5},$$

where f4 is the focal length of the fourth lens group G4 and f5 the focal length of the fifth lens group G5.

Condition (5) defines the focal length of the fifth lens group G5 to the focal length of the fourth lens group G4. When the zoom optical system ZL satisfies this condition (5), it becomes feasible to ensure the optical performance with image stabilization on and to relieve degradation of optical performance due to manufacturing error. If the ratio is smaller than the lower limit of condition (5), the refracting power of the fifth lens group G5 will become too strong to correct for comatic aberration. Furthermore, it is unfavorable because it will result in significant degradation of imaging performance against manufacturing error such as decentration among the lens groups, or significant worsening of decentration comatic aberration. On the other hand, if the ratio is larger than the upper limit of condition (5), the refracting power of the fourth lens group G4 will become too strong. This is unfavorable because spherical aberration and comatic aberration will worsen at the telephoto end. The effect of the present invention can be made more certain by setting the upper limit of condition (5) to 1.5.

The zoom optical system ZL is desirably configured to satisfy condition (6) below:

$$3.0<f1/(-f2)<6.9 \qquad (6),$$

where f1 is the focal length of the first lens group G1 and f2 the focal length of the second lens group G2.

Condition (6) defines the focal length of the first lens group G1 to the focal length of the second lens group G2. This zoom optical system ZL is able to ensure a sufficient zoom ratio and to implement good optical performance when satisfying the condition (6). If the ratio is smaller than the lower limit of this condition (6), the refracting power of the first lens group G1 will become so strong as to significantly worsen spherical aberration at the telephoto end. It is also unfavorable in that chromatic aberration of magnification will also worsen significantly at the wide-angle end. On the other hand, if the ratio is larger than the upper limit of condition (6), the refracting power of the second lens group G2 will become too strong to correct for off-axis aberrations at the wide-angle end, particularly, curvature of field and astigmatism. The effect of the present invention can be made more certain by setting the lower limit and the upper limit of condition (6) to 4.0 and 6.5, respectively.

Furthermore, the zoom optical system ZL is desirably configured to satisfy condition (7) below:

$$2.0<f1/f3<4.7 \qquad (7),$$

where f1 is the focal length of the first lens group G1 and f3 the focal length of the third lens group G3.

Condition (7) defines the focal length of the first lens group G1 to the focal length of the third lens group G3. This zoom optical system ZL is able to implement good optical performance and more effective color correction when satisfying the condition (7). If the ratio is larger than the upper limit of condition (7), the refracting power of the third lens group G3 will become too strong to correct for comatic aberration at the wide-angle end and spherical aberration at the telephoto end. It will also result in significant degradation of imaging performance due to manufacturing error. On the other hand, if the ratio is smaller than the lower limit of condition (7), the refracting power of the first lens group G1 will become so strong as to significantly worsen spherical aberration at the telephoto end. It is also unfavorable in that chromatic aberration of magnification will also worsen significantly at the wide-angle end. The effect of the present invention can be made more certain by setting the lower limit and the upper limit of condition (7) to 3.0 and 4.5, respectively.

The zoom optical system ZL is desirably configured to satisfy condition (8) below:

$$0.4<(-f2)/f3<0.9 \qquad (8),$$

where f2 is the focal length of the second lens group G2 and f3 the focal length of the third lens group G3.

Condition (8) defines the focal length of the second lens group G2 to the focal length of the third lens group G3. This zoom optical system ZL, when satisfying the condition (8), is able to achieve downsizing thereof while ensuring a predetermined back focus. If the ratio is lower than the lower limit of condition (8), the refracting power of the second lens group G2 will become so strong as to worsen curvature of field and astigmatism at the wide-angle end though it is advantageous for securing the back focus. On the other hand, if the ratio is larger than the upper limit of condition (8), the refracting power of the second lens group G2 will become so weak as to increase the moving distance of the second lens group G2 upon zooming and make it difficult to achieve downsizing of the zoom optical system ZL. If the refracting power of the other zoom lens group is increased in order to relieve influence thereof, it will become difficult to correct for spherical aberration and chromatic aberration at the telephoto end. The effect of the present invention can be made more certain by setting the upper limit and the lower limit of condition (8) to 0.8 and 0.5, respectively.

The first lens group G1 is preferably configured to have a negative lens and two positive lenses. This configuration allows effective correction for spherical aberration. In this case, the negative lens and one positive lens are preferably constructed as a cemented lens. This permits effective correction for chromatic aberration.

The second lens group G2 is preferably configured to have three negative lenses and one positive lens. This configuration allows effective correction for various aberrations. The second lens group G2 preferably has an aspherical surface and, particularly, it is more preferably configured so that the surface nearest to the object is of an aspherical shape. This permits good correction for curvature of field and distortion at the wide-angle end. The two back lenses (positive lens and negative lens nearest to the image surface in the second lens group G2) may be constructed as a cemented lens.

The third lens group G3 is preferably configured to have a negative lens and two positive lenses. This allows effective correction for spherical aberration. In this case, the positive lens is preferably constructed in the form of a cemented lens.

The fourth lens group G4 is preferably configured without any aspheric lens surface. The fifth lens group G5 is preferably configured to have a positive single lens and a cemented lens of positive and negative lenses.

Other conditions for construction of the zoom optical system ZL as described above will be explained below. In this case, the zoom optical system ZL is configured to make correction for the image surface with occurrence of camera shake by moving the fourth lens group G4 in directions orthogonal to the optical axis as indicated by arrows in the upper part in FIG. 1. First, the zoom optical system ZL is desirably configured to satisfy condition (9) below:

$$1.0<f4/f2<3.3 \qquad (9),$$

where f2 is the focal length of the second lens group G2 and f4 the focal length of the fourth lens group G4.

Condition (9) defines the focal length of the fourth lens group G4 to the focal length of the second lens group G2. This zoom optical system ZL, when satisfying this condition (9), is able to realize good optical performance even with image stabilization on and ensure a predetermined zoom ratio. If the ratio is larger than the upper limit of condition (9), the refracting power of the fourth lens group G4 will become weak. This increases a shift amount of the fourth lens group G4 necessary for the image stabilization and it becomes difficult to simultaneously correct for variation in curvature of field at the wide-angle end and decentration comatic aberration at the telephoto end with image stabilization on. On the other hand, if the ratio is smaller than the lower limit of condition (9), the refracting power of the second lens group G2 will become too weak to ensure a predetermined zoom ratio. If the refracting power of the third lens group G3 is increased in order to compensate for it, it will become difficult to correct for spherical aberration at the telephoto end, unfavorably. The effect of the present invention can be made more certain by setting the lower limit and the upper limit of condition (9) to 2.0 and 3.0, respectively.

The zoom optical system ZL is desirably configured to satisfy condition (10) below:

$$1.0 < f5/(-f4) < 2.0 \tag{10},$$

where f4 is the focal length of the fourth lens group G4 and f5 the focal length of the fifth lens group G5.

Condition (10) defines the focal length of the fifth lens group G5 to the focal length of the fourth lens group G4. This zoom optical system ZL, when satisfying this condition (10), is able to ensure optical performance with image stabilization on and relieve degradation of optical performance due to manufacturing error. If the ratio is smaller than the lower limit of condition (10), the refracting power of the fifth lens group G5 will become too strong to correct for comatic aberration. Furthermore, it is unfavorable in that it will result in significant degradation of imaging performance against manufacturing error such as decentration among the lens groups, or significant worsening of decentration comatic aberration. On the other hand, if the ratio is larger than the upper limit of condition (10), the refracting power of the fourth lens group G4 will become too strong. This is unfavorable because spherical aberration and comatic aberration will worsen at the telephoto end. The effect of the present invention can be made more certain by setting the upper limit of condition (10) to 1.5.

The zoom optical system ZL is desirably configured to satisfy condition (11) below:

$$0.4 < (-f2)/f3 < 0.9 \tag{11},$$

where f2 is the focal length of the second lens group G2 and f3 the focal length of the third lens group G3.

Condition (11) defines the focal length of the second lens group G2 to the focal length of the third lens group G3. This zoom optical system ZL, when satisfying condition (11), is able to achieve downsizing thereof while ensuring a predetermined back focus. If the ratio is lower than the lower limit of condition (11), the refracting power of the second lens group G2 will become so strong as to worsen curvature of field and astigmatism at the wide-angle end though it is advantageous for securing the back focus. On the other hand, if the ratio is larger than the upper limit of condition (11), the refracting power of the second lens group G2 will become so weak as to increase the moving distance of the second lens group G2 upon zooming and make it difficult to achieve downsizing of the zoom optical system ZL. If the refracting power of the other zoom lens group is increased in order to relieve influence thereof, it will become difficult to correct for spherical aberration and chromatic aberration at the telephoto end. The effect of the present invention can be made more certain by setting the upper limit and the lower limit of condition (11) to 0.8 and 0.5, respectively.

The zoom optical system ZL is desirably configured to satisfy condition (12) below:

$$3.0 < f1/(-f2) < 6.9 \tag{12},$$

where f1 is the focal length of the first lens group G1 and f2 the focal length of the second lens group G2.

Condition (12) defines the focal length of the first lens group G1 to the focal length of the second lens group G2. This zoom optical system ZL is able to ensure a sufficient zoom ratio and to implement good optical performance when satisfying the condition (12). If the ratio is smaller than the lower limit of condition (12), the refracting power of the first lens group G1 will become so strong as to significantly worsen spherical aberration at the telephoto end. It is also unfavorable in that chromatic aberration of magnification will also worsen significantly at the wide-angle end. On the other hand, if the ratio is larger than the upper limit of condition (12), the refracting power of the second lens group G2 will become too strong to correct for off-axis aberrations at the wide-angle end, particularly, curvature of field and astigmatism. The effect of the present invention can be made more certain by setting the upper limit and the lower limit of condition (12) to 6.5 and 4.0, respectively.

Furthermore, the zoom optical system ZL is desirably configured to satisfy condition (13) below:

$$2.0 < f1/f3 < 4.7 \tag{13},$$

where f1 is the focal length of the first lens group G1 and f3 the focal length of the third lens group G3.

Condition (13) defines the focal length of the first lens group G1 to the focal length of the third lens group G3. This zoom optical system ZL is able to implement good optical performance and more effective color correction when satisfying the condition (13). If the ratio is larger than the upper limit of condition (13), the refracting power of the third lens group G3 will become too strong to correct for comatic aberration at the wide-angle end and spherical aberration at the telephoto end. It will also result in significant degradation of imaging performance due to manufacturing error. On the other hand, if the ratio is smaller than the lower limit of condition (13), the refracting power of the first lens group G1 will become so strong as to significantly worsen spherical aberration at the telephoto end. It is also unfavorable in that chromatic aberration of magnification will also worsen significantly at the wide-angle end. The effect of the present invention can be made more certain by setting the lower limit and the upper limit of condition (13) to 3.0 and 4.5, respectively.

As described above, this zoom optical system ZL is configured to make correction for the image surface with occurrence of camera shake by moving the fourth lens group G4 in the directions orthogonal to the optical axis, and when this fourth lens group G4 is composed of a cemented lens of a biconcave negative lens and a positive meniscus lens with a convex surface on the object side in the order from the object side and further configured to satisfy conditions (14)-(16) below, it becomes feasible to suppress decentration aberration in correction for the image surface with occurrence of camera shake and achieve good imaging performance.

First, it preferably satisfies condition (14) below:

$$0.25 < Rs/(-f4) < 0.45 \tag{14},$$

where f4 is the focal length of the fourth lens group G4 and Rs the radius of curvature of a cemented surface of the cemented lens.

Condition (14) defines the radius of curvature of the cemented surface of the cemented lens to the focal length of the fourth lens group G4. If the ratio is smaller than the lower limit of condition (14), the curvature of the cemented surface will become so small as to make negative spherical aberration too significant to correct for. On the other hand, if the ratio is larger than the upper limit of condition (14), the curvature of the cemented surface will become so large as to make positive spherical aberration too significant to correct for. If the ratio is outside the range between the upper limit and the lower limit, it will be difficult to correct for spherical aberration and the decentration aberration will be so significant when the fourth lens group G4 is decentered for correction for the image surface with occurrence of camera shake. The effect of the present invention can be made more certain by setting the upper limit and the lower limit of condition (14) to 0.40 and 0.30, respectively.

The fourth lens group G4 is desirably configured to satisfy condition (15) below:

$$0.07 < Np - Nn < 0.20 \quad (15),$$

where Np is the d-line refractive index of the positive meniscus lens in the cemented lens constituting the fourth lens group G4, and Nn the d-line refractive index of the biconcave lens.

Condition (15) defines the difference between the refractive indices of the positive meniscus lens and the biconcave lens of the cemented lens constituting the fourth lens group G4. If the difference is outside the range between the upper limit and the lower limit of this condition (15), a tilt of the image surface will become too large to correct for when the fourth lens group G4 is decentered for correction for the image surface with occurrence of camera shake.

Furthermore, the fourth lens group G4 is desirably configured to satisfy condition (16) below:

$$15 < vp - vn < 27 \quad (16),$$

where vp is the Abbe number of the positive meniscus lens in the cemented lens constituting the fourth lens group G4, and vn the Abbe number of the biconcave lens.

Condition (16) defines the difference between the Abbe numbers of the positive meniscus lens and the biconcave lens of the cemented lens constituting the fourth lens group G4. If the difference is outside the range between the upper limit and the lower limit of this condition (16), the fourth lens group G4 will give rise to chromatic aberration too significant to correct for.

This zoom optical system ZL is desirably configured so that the second lens group G2 has an aspherical surface. This permits good correction for curvature of field and distortion at the wide-angle end.

Figure 21A:
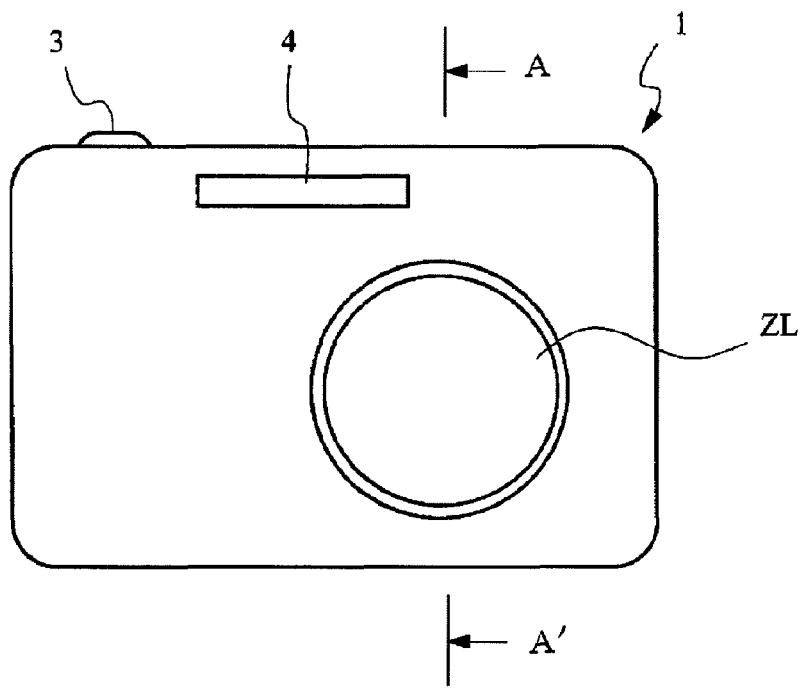
FIG. 21A is a front view of a digital still camera equipped with the zoom optical system according to the present invention.
Figure 21B:
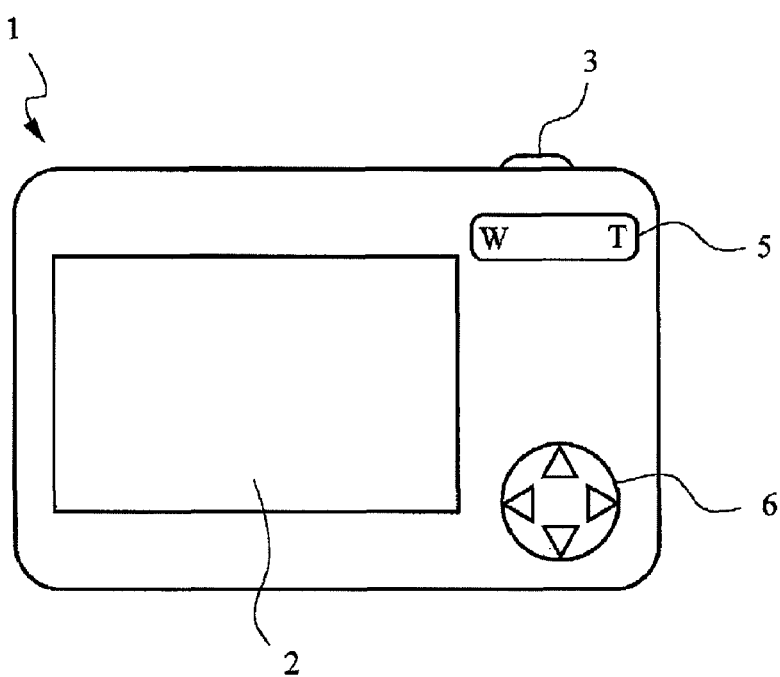
FIG. 21B is a back view of the digital still camera equipped with the zoom optical system according to the present invention.
Figure 22:
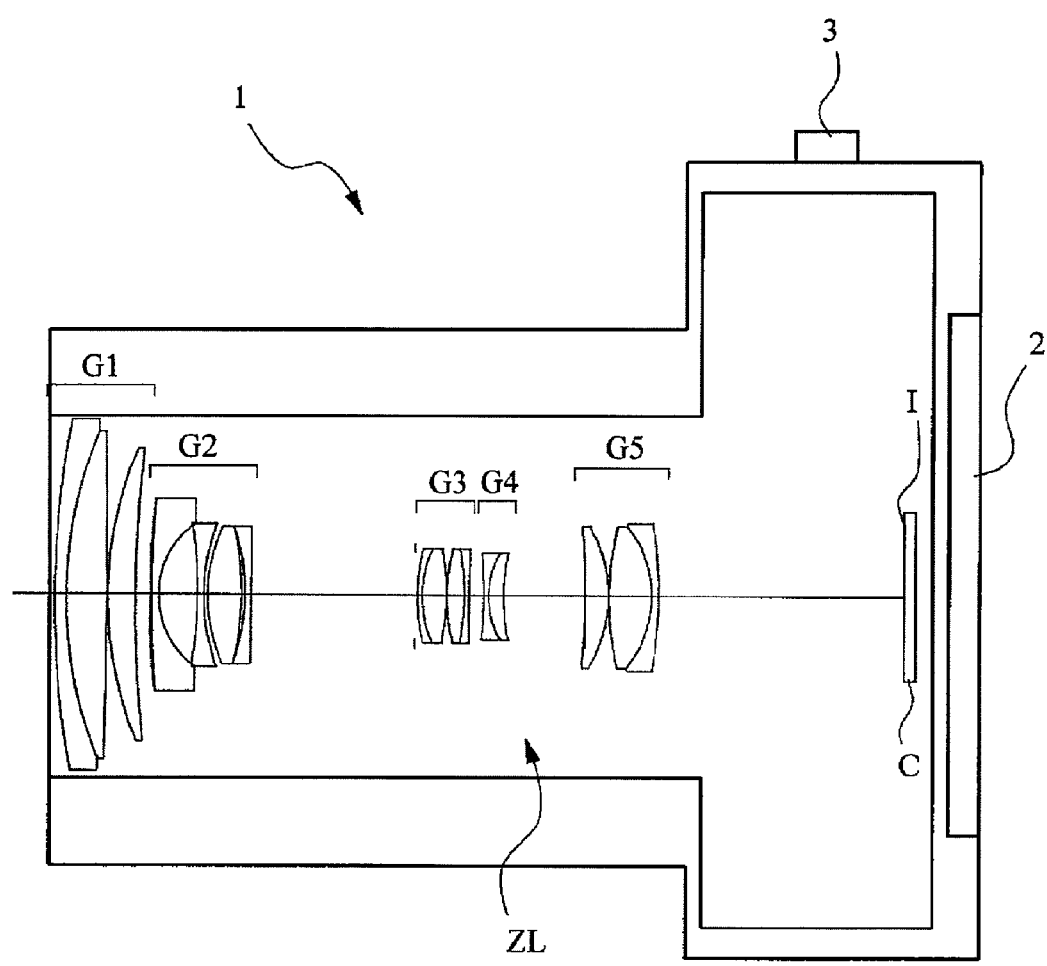
FIG. 22 is a sectional view along line A-A' in FIG. 21A.

FIGS. 21 and 22 show a configuration of a digital still camera 1 (which will be referred to simply as a camera) as an optical instrument equipped with the above-described zoom optical system ZL. This camera is configured as follows: when an unrepresented power button is depressed, an unrepresented shutter of a taking lens (zoom optical system ZL) is opened, and light from an unrepresented object is condensed in the zoom optical system ZL to be focused on an image sensor C (e.g., CCD, CMOS, or the like) arranged on the image plane. The object image focused on the image sensor C is displayed on a liquid crystal monitor 2 located on the back of the camera 1. A photographer determines a composition of the object image while watching the liquid crystal monitor 2. Then the photographer pushes a release button 3 to take the object image by the image sensor C and record to save it in an unrepresented memory.

This camera 1 is provided with an auxiliary light emitter 4 to emit auxiliary light to a dark object, a wide(W)-tele(T) button 5 for zooming of the zoom optical system ZL from the wide-angle end state (W) to the telephoto end state (T), a function button 6 used for setting various conditions of the camera 1, and so forth. The camera 1 may be constructed as a so-called single-lens reflex camera having a quick return mirror, a focusing screen, a pentagonal prism, an eyepiece, and so forth. In that case, the zoom optical system ZL may be one incorporated in an interchangeable lens to be detachably mounted on the single-lens reflex camera.

The above description and the embodiments hereinafter show the zoom optical systems ZL of the five-groups configuration, but it is noted that the above configuration conditions and others are also applicable to the other group configurations including six groups, seven groups, and so forth. For example, the lens system in the embodiments of the present invention is composed of five movable groups, but it is also possible to add another lens group between the lens groups, or to add another lens group adjacent to the image side or the object side of the lens system. The lens groups refers to parts, separated from each other by an air space which varies at the time of varying power, each having at least one lens.

A single lens group or two or more lens groups, or a partial lens group may be configured as a focusing lens group to be moved in the direction of the optical axis so as to implement focusing from an infinity object to a near object. In this case, the focusing lens group is also applicable to autofocus, and is also suitable for drive of a motor (e.g., an ultrasonic motor) for autofocus. Particularly, it is preferable that the second lens group G2 be configured as the focusing lens group. It can also be contemplated that the first lens group G1 is configured as the focusing lens group.

In the present invention, in order to prevent a failure in photography due to blurring of the image caused by camera shake or the like likely to occur in a zoom lens with a high zoom ratio, the lens system is combined with a vibration detector for detecting vibration of the lens system, and a driving device; the whole or a part of one lens group out of the lens groups forming the lens system is decentered as an anti-vibration lens group; the driving device drives the anti-vibration lens group so as to correct the image blur (variation in position of the image plane) caused by vibration of the lens system detected by the vibration detector; the image is shifted thereby to correct the image blur. Particularly, it is preferable that the fourth lens group G4 be configured as the anti-vibration lens group. As described above, the zoom optical system ZL according to the embodiments of the present invention can be functioned as a so-called anti-vibration optical system.

The above described the configuration wherein at least one aspherical lens was arranged in the second lens group G2, but it can also be contemplated that a lens surface of any other lens group is configured as an aspherical surface. In this connection, the aspherical surface may be any one of an aspherical surface made by grinding, a glass mold aspherical surface made by molding glass into an aspherical shape, and a composite aspherical surface made by forming an aspherical shape of resin on a surface of glass. The lens surfaces may also be diffractive surfaces. The lenses may be gradient-index lenses (GRIN lenses) or plastic lenses. The lens surfaces may be formed spherical, planar, or aspherical. The spherical or planar lens surfaces are favorable in that processing of lenses and adjustment of their assembling are easy, so as to prevent optical performances from deteriorating because of errors in the processing and adjustment of assembling. They are also favorable in that depicting performances deteriorate less even when the image surface is shifted.

An aperture stop S is preferably arranged near the third lens group G3, but it is also possible to use a lens frame so as to serve as an aperture stop instead thereof, without providing any member as an aperture stop. This aperture stop is conceivably positioned before, inside, or after the third lens group G3.

Furthermore, each lens surface may be coated with an antireflection film having high transmittance in a wide wavelength region, to reduce flares and ghosts, thereby achieving high optical performance.

Figure 23:
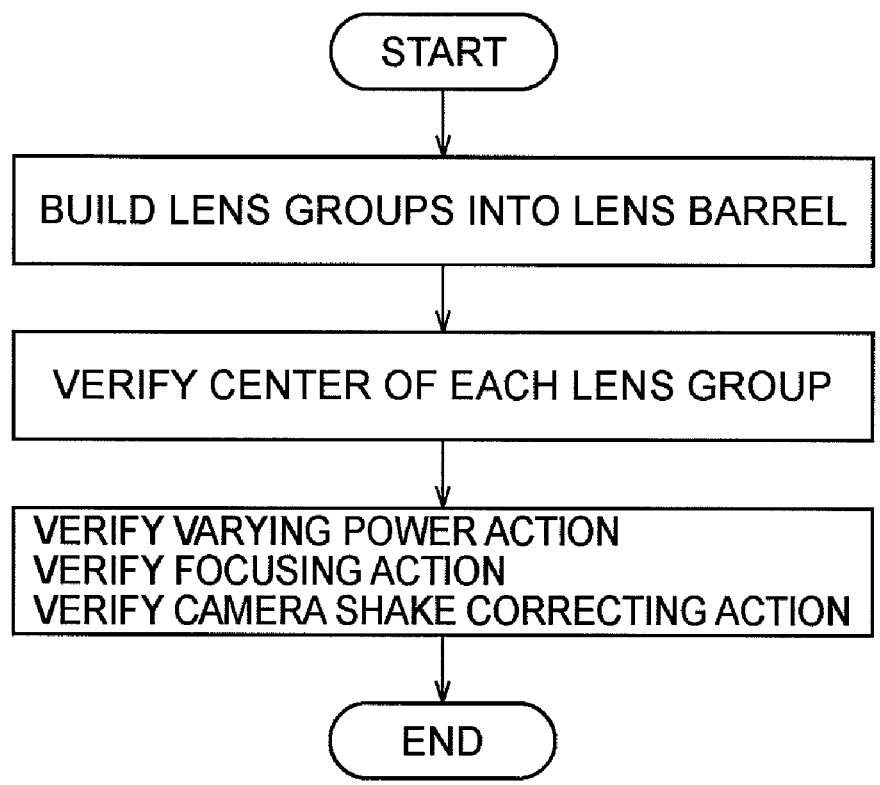
FIG. 23 is a flowchart showing a method of manufacturing the zoom optical system in accordance with the present invention.

An outline of a method of manufacturing the zoom optical system will now be explained with reference to FIG. 23.

To begin with, the first lens group G1, second lens group G2, third lens group G3, fourth lens group G4, and fifth lens group G5 of this embodiment are built into a cylindrical lens barrel. The lens groups may be built into the lens barrel one by one in their order along the optical axis, or a part or all of the lens groups may be integrally held with a holding member and then assembled with a lens barrel member. Preferably, after the lens groups are built into the lens barrel, whether or not an image of an object is formed in the state where the lens groups are built into the lens barrel is determined.

After the zoom optical system is assembled as mentioned above, its various actions are verified. Examples of the actions include a varying power action in which at least a part of lens groups moves along the optical axis when varying power, a focusing action in which a lens group for focusing from an object at infinity to an object at a close distance moves along the optical axis, and a camera shake correcting action in which at least a part of lenses moves so as to have a component orthogonal to the optical axis. When varying power from the wide-angle end state to the telephoto end state in this embodiment, the zoom optical system ZL is desirably configured so that the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases. The various actions can be verified in any order.

The present invention was described with the constituent features of the embodiment for easier explanation but it should be noted that the present invention is by no means limited to them.

EXAMPLES

Each of the examples of the present invention will be described below on the basis of the accompanying drawings. FIG. 1 is a sectional view showing the configuration of the zoom optical system ZL according to an example of the present invention, and the refracting power layout of this zoom optical system ZL and movement of each of lens groups during change in the focal length state from the wide-angle end state (W) to the telephoto end state (T), namely upon zooming from the wide-angle end state (W) to the telephoto end state (T), are indicated in the lower part by arrows in FIG. 1. As shown in this FIG. 1, the zoom optical system ZL of the example is composed of the first lens group G1 having a positive refracting power, the second lens group G2 having a negative refracting power, the third lens group G3 having a positive refracting power, the fourth lens group G4 having a negative refracting power, and the fifth lens group G5 having a positive refracting power in the order from the object side. Upon zooming from the wide-angle end state to the telephoto end state, the distances between the lens groups vary so as to increase the aerial gap between the first lens group G1 and the second lens group G2, decrease the aerial gap between the second lens group G2 and the third lens group G3, increase the aerial gap between the third lens group G3 and the fourth lens group G4, and decrease the aerial gap between the fourth lens group G4 and the fifth lens group G5. The fourth lens group G4 is moved in the directions orthogonal to the optical axis to implement image stabilization (prevention of vibration).

In each example, an aspherical surface is expressed by equation (a) below:

$$S(y)=(y^2/r)/\{1+(1-\kappa \times y^2/r^2)^{1/2}\}+A4 \times y^4+A6 \times y^6+A8 \times y^8+A10 \times y^{10}+A12 \times y^{12}+A14 \times y^{14} \quad (a),$$

where y is a height in a direction perpendicular to the optical axis, S(y) a distance (sag) along the optical axis from a tangent plane at a top of the aspherical surface to the aspherical surface at height y, r a radius of curvature of a reference spherical surface (radius of paraxial curvature), κ the conic constant, and An the aspheric coefficient of order n. In the examples hereinafter, "E−n" represents "×10$^{-n}$".

In each example the second-order aspheric coefficient A2 is 0. In the table of each example, the aspherical surface is accompanied by mark * on the left of a surface number.

First Example

FIG. 1 is a drawing showing the configuration of the zoom optical system ZL1 according to the first example of the present invention. In the zoom optical system ZL1 of FIG. 1, the first lens group G1 is composed of a cemented lens of a negative meniscus lens L11 with a convex surface on the object side and a biconvex positive lens L12, and a positive meniscus lens L13 with a convex surface on the object side in the order from the object side. The second lens group G2 is composed of a negative meniscus lens L21 with a convex surface on the object side, a biconcave negative lens L22, a biconvex positive lens L23, and a negative meniscus lens L24 with a concave surface on the object side in the order from the object side, and the negative meniscus lens L21 located nearest to the object in the second lens group G2 is an aspherical lens with aspherical surface made by laying a resin layer on a glass lens surface on the object side. The third lens group G3 is composed of a cemented lens of a negative meniscus lens L31 with a convex surface on the object side and a biconvex positive lens L32, and a cemented lens of a biconvex positive lens L33 and a biconcave negative lens L34 in the order from the object side. The fourth lens group G4 is composed of a cemented lens of a biconcave negative lens L41 and a positive meniscus lens L42 with a convex surface on the object side in the order from the object side. The fifth lens group G5 is composed of a negative meniscus lens L51 with a concave surface on the object side, and a cemented lens of a biconvex positive lens L52 and a negative meniscus lens L53 with a concave surface on the object side in the order from the object side. The stop S is located between the second lens group G2 and the third lens group G3 and moves together with the third lens group G3 upon zooming from the wide-angle end state to the telephoto end state. Focusing from a long distance to a short distance is implemented by moving the second lens group G2 in the direction toward the object.

For correcting for rotational shake of angle θ in a lens wherein the focal length of the entire system is f and wherein an anti-vibration factor (ratio of an image movement amount on the image plane to a movement amount of the moving lens group in image stabilization) is K, the moving lens group for image stabilization is moved by (f·tan θ)/K in the direction orthogonal to the optical axis. In the wide-angle end state of the first example, the anti-vibration factor is 1.19 and the focal length is 18.4 (mm); therefore, the moving distance of the fourth lens group G4 for correction for rotational shake of 0.70° is 0.19 (mm). In the telephoto end state of the first example, the anti-vibration factor is 1.78 and the focal length is 102.0 (mm); therefore, the moving distance of the fourth lens group G4 for correction for rotational shake of 0.30° is 0.30 (mm).

Table 1 below presents values of specifications in the first example. In this Table 1, f represents the focal length, FNO the F number, ω a half angle of view, and Bf the back focus. Furthermore, the surface number shows an order of each lens surface from the object side along the traveling direction of rays, the surface separation does a spacing on the optical axis from each optical surface to a next optical surface, and the refractive index and Abbe number do values for the d-line (λ=587.6 nm). The units of the focal length f, radius of curvature, surface separation, and other lengths presented in all the specification values below are generally "mm," but the units do not always have to be limited to it because equivalent optical performance is achieved when the optical system is proportionally enlarged or reduced. The radius of curvature of 0.0000 indicates a plane and the refractive index of air, 1.00000, is omitted. The same definition of these symbols and description of the specifications tables also apply to the examples hereinafter. In the following tables, W, IFL, T, IH, and TLL denote the Wide-angle end, Intermediate focal length, Telephoto end, Image height, and Total lens length, respectively. Also, s, r, d, ν, and n denote the Surface No., Radius of curvature, Surface distance, Abbe number, and Refractive index, respectively, in the following tables.

In this first example, the lens surface of the sixth surface is formed in an aspherical shape. Table 2 below shows the data of the aspherical surface, i.e., values of the radius R of curvature at the top, the conic constant κ, and the aspheric constants A4-A14.

TABLE 2

| [6th surface] | | | | | | |
|---|---|---|---|---|---|---|
| κ | A4 | A6 | A8 | A10 | A12 | A14 |
| −20.0000 | 9.97310E−06 | −5.83310E−09 | −2.86090E−10 | 2.38720E−12 | −0.86222E−14 | 0.11867E−16 |

In this first example, the following distances vary upon zooming: axial aerial gap d1 between the first lens group G1 and the second lens group G2; axial aerial gap d2 between the second lens group G2 and the third lens group G3; axial aerial gap d3 between the third lens group G3 and the fourth lens group G4; and axial aerial gap d4 between the fourth lens group G4 and the fifth lens group G5. Table 3 below shows the variable gaps at respective focal lengths in the wide-angle end state, in an intermediate focal length state, and in the telephoto end state.

TABLE 1

| s | r | d | ν | n |
|---|---|---|---|---|
| 1 | 148.7657 | 1.800 | 23.78 | 1.846660 |
| 2 | 68.5487 | 6.400 | 60.67 | 1.603112 |
| 3 | −1221.9245 | 0.100 | | |
| 4 | 58.4567 | 4.400 | 55.52 | 1.696797 |
| 5 | 206.7149 | (d1) | | |
| *6 | 236.8432 | 0.200 | 38.09 | 1.553890 |
| 7 | 157.9799 | 1.200 | 42.72 | 1.834807 |
| 8 | 14.0568 | 6.046 | | |
| 9 | −70.2926 | 1.000 | 42.72 | 1.834807 |
| 10 | 33.5180 | 0.550 | | |
| 11 | 25.6163 | 5.400 | 23.78 | 1.846660 |
| 12 | −45.1693 | 0.457 | | |
| 13 | −32.8965 | 1.000 | 42.72 | 1.834807 |
| 14 | −838.1286 | (d2) | | |
| 15 | 0.0000 | 0.400 | | |
| 16 | 28.8113 | 0.800 | 32.35 | 1.850260 |
| 17 | 17.5530 | 3.800 | 82.52 | 1.497820 |
| 18 | −38.2871 | 0.100 | | |
| 19 | 31.9433 | 2.800 | 50.23 | 1.719995 |
| 20 | −35.1689 | 0.800 | 32.35 | 1.850260 |
| 21 | 1996.3119 | (d3) | | |
| 22 | −56.0395 | 0.800 | 54.66 | 1.729157 |
| 23 | 13.0204 | 2.400 | 32.35 | 1.850260 |
| 24 | 35.9739 | (d4) | | |
| 25 | −95.8740 | 3.600 | 64.10 | 1.516800 |
| 26 | −21.5155 | 0.100 | | |
| 27 | 45.7672 | 6.800 | 70.41 | 1.487490 |
| 28 | −17.2796 | 1.200 | 32.35 | 1.850260 |
| 29 | −59.0941 | (Bf) | | |

| | W | IFL | T |
|---|---|---|---|
| f = | 18.4~ | 50.0~ | 102.0 |
| F. NO = | 3.7~ | 5.0~ | 5.9 |
| ω = | 38.7~ | 15.1~ | 7.6 |
| IH = | 14.0~ | 14.0~ | 14.0 |
| TLL = | 133.953~ | 156.395~ | 176.552 |
| Bf = | 38.531~ | 54.930~ | 65.472 |

| Focal lengths of the respective lens groups | | |
|---|---|---|
| Group | Initial surface | Focal length |
| 1 | 1 | 89.316 |
| 2 | 6 | −14.903 |
| 3 | 15 | 24.882 |
| 4 | 22 | −36.305 |
| 5 | 25 | 41.985 |

TABLE 3

| | W | IFL | T |
|---|---|---|---|
| d1 | 2.299 | 24.709 | 41.018 |
| d2 | 25.861 | 9.494 | 2.800 |
| d3 | 2.226 | 6.495 | 8.308 |
| d4 | 12.882 | 8.613 | 6.800 |

Table 4 below presents values corresponding to the respective conditions in the first example. In this Table 4, f1 represents the focal length of the first lens group G1, f2 the focal length of the second lens group G2, f3 the focal length of the third lens group G3, f4 the focal length of the fourth lens group G4, f5 the focal length of the fifth lens group G5, Rs the radius of curvature of the cemented surface of the cemented lens in the fourth lens group G4, Np the refractive index of the positive meniscus lens L42 for the d-line, Nn the refractive index of the biconcave negative lens L41 for the d-line, νn the Abbe number of the positive meniscus lens L42, and νn the Abbe number of the biconcave negative lens L41. The same definition of symbols also applies to the examples hereinafter.

TABLE 4

| (1) νp = 32.35 |
| (2) Rs/(−f4) = 0.359 |
| (3) Np − Nn = 0.121103 |
| (4) νn − νp = 22.31 |
| (5) f5/(−f4) = 1.16 |
| (6) f1/(−f2) = 5.99 |
| (7) f1/f3 = 3.59 |
| (8) (−f2)/f3 = 0.60 |
| (9) f4/f2 = 2.44 |

Figure 2A:
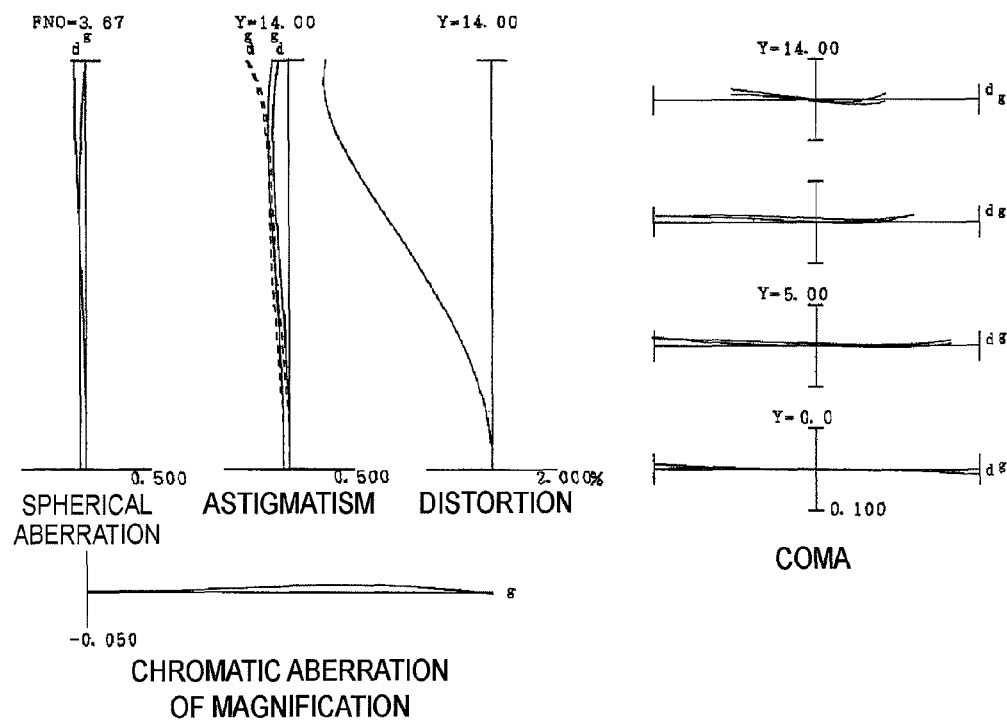
FIG. 2A is aberration diagrams of various aberrations in the first embodiment in focus at infinity in the wide-angle end state.
Figure 2B:
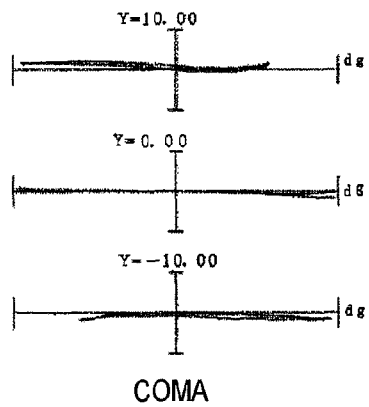
FIG. 2B is a meridional transverse aberration diagram with image stabilization against rotational shake of 0.70° in the first embodiment in the infinity photography state in the wide-angle end state.
Figure 3:
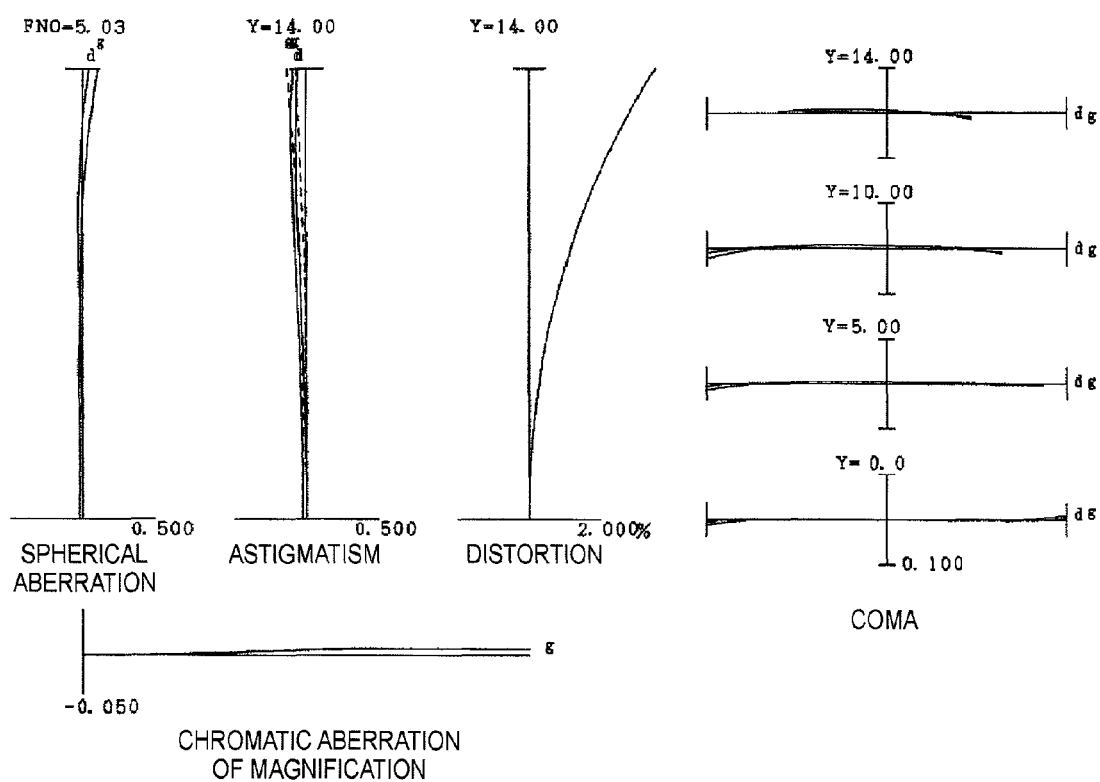
FIG. 3 is aberration diagrams in the first embodiment in focus at infinity in an intermediate focal length state.
Figure 4A:
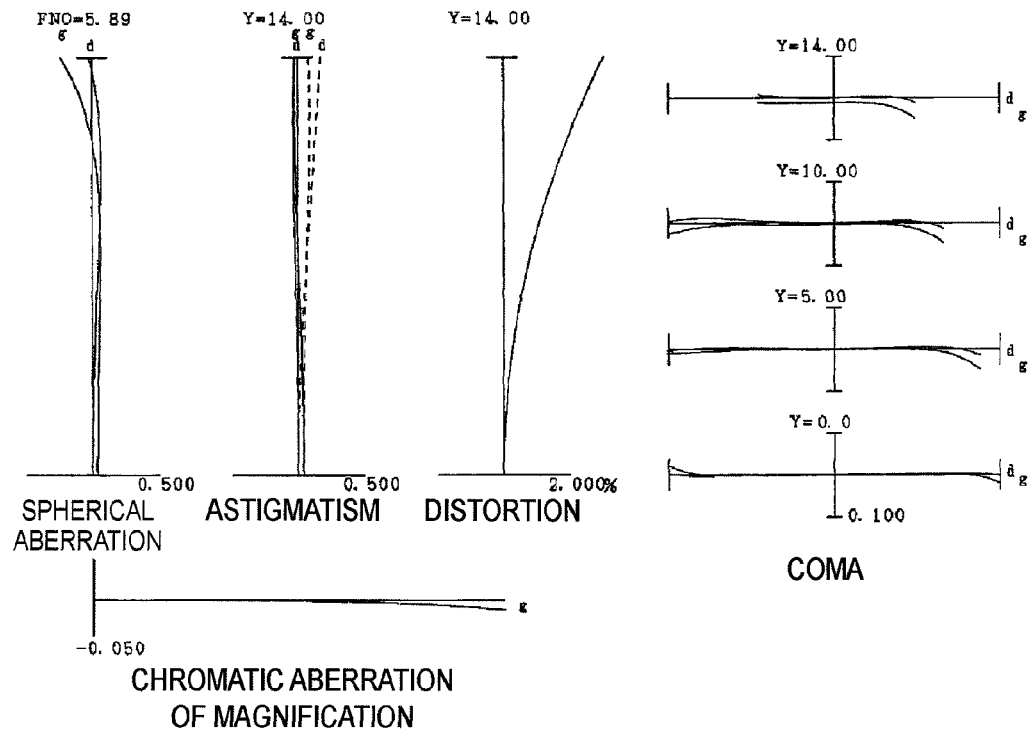
FIG. 4A is aberration diagrams of various aberrations in the first embodiment in focus at infinity in the telephoto end state.
Figure 4B:
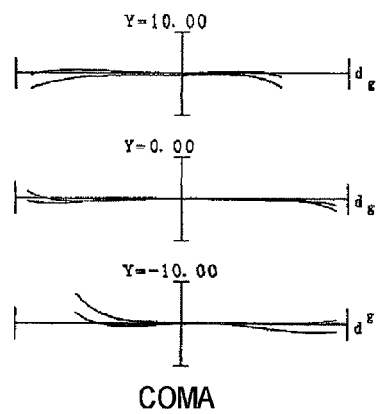
FIG. 4B is a meridional transverse aberration diagram with image stabilization against rotational shake of 0.30° in the first embodiment in the infinity photography state in the telephoto end state.

FIG. 2A shows aberration diagrams of aberrations in the first example in focus at infinity in the wide-angle end state, FIG. 3 aberration diagrams of aberrations in the first example in focus at infinity in the intermediate focal length state, and FIG. 4A aberration diagrams of aberrations in the first example in focus at infinity in the telephoto end state. Furthermore, FIG. 2B shows a meridional transverse aberration diagram with image stabilization for the rotational shake of 0.70° in the first example in the infinity photography state in the wide-angle end state, and FIG. 4B a meridional transverse aberration diagram with image stabilization for the rotational shake of 0.30° in the first example in the infinity photography state in the telephoto end state.

In each aberration diagram, FNO represents the F number, Y the image height, d the d-line (λ=587.6 nm), and g the g-line (λ=435.6 nm). In each aberration diagram showing astigmatism, each solid line indicates a sagittal image surface and each dashed line a meridional image surface. Furthermore, in each aberration diagram showing spherical aberration, each solid line indicates spherical aberration, and a dashed line the sine condition. The same definition of aberration diagrams also applies to the examples hereinafter. It is clearly seen from the aberration diagrams that in the first example the zoom optical system ZL1 is corrected well for the various aberrations in each of the focal length states from the wide-angle end state to the telephoto end state and thus has excellent imaging performance.

Second Example

Figure 5:
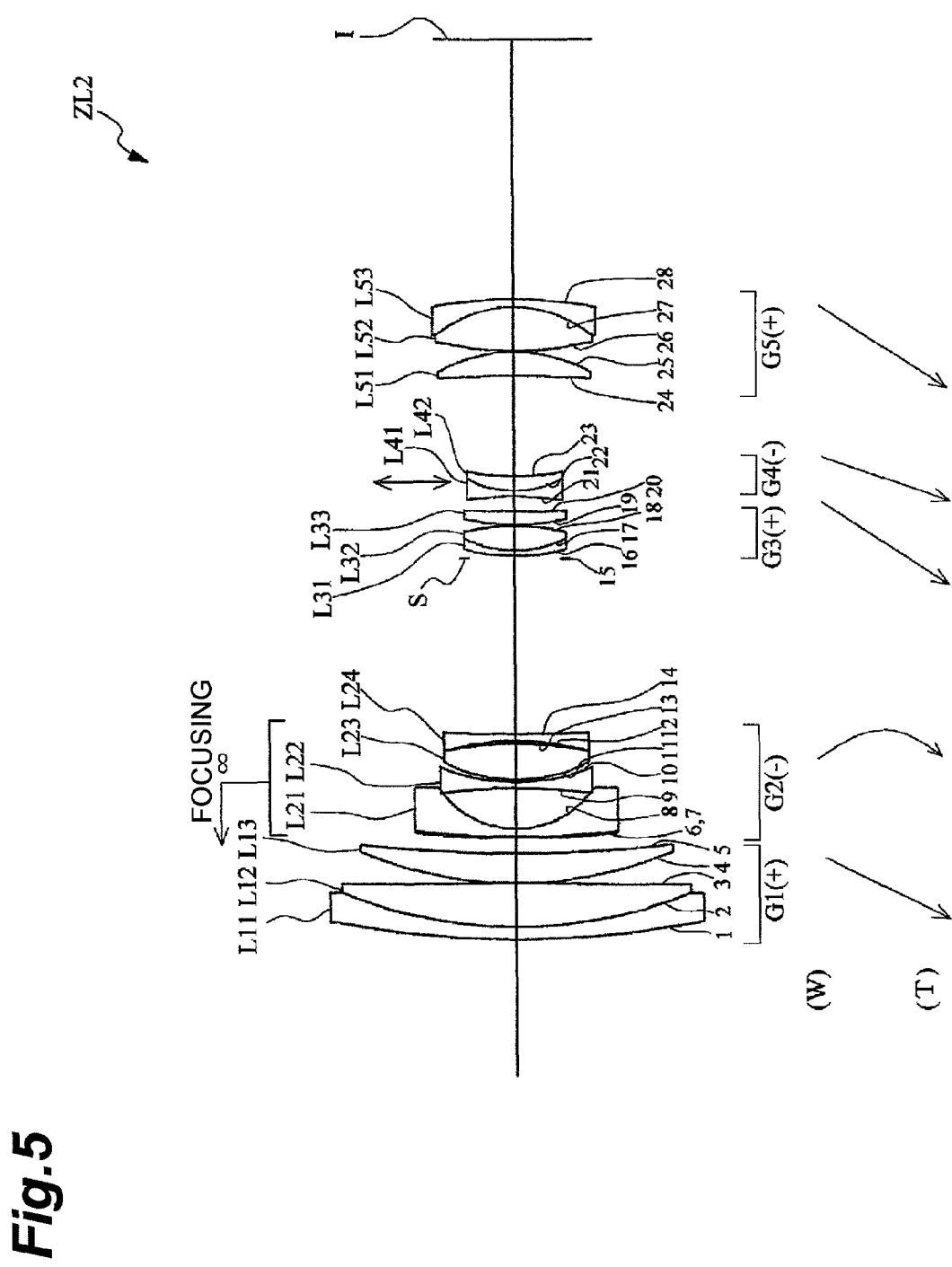
FIG. 5 is a sectional view showing a configuration of a zoom optical system according to the second embodiment.

FIG. 5 is a drawing showing the configuration of the zoom optical system ZL2 according to the second example of the present invention. In the zoom optical system ZL2 of FIG. 5, the first lens group G1 is composed of a cemented lens of a negative meniscus lens L11 with a convex surface on the object side and a biconvex positive lens L12, and a positive meniscus lens L13 with a convex surface on the object side in the order from the object side. The second lens group G2 is composed of a negative meniscus lens L21 with a convex surface on the object side, a biconcave negative lens L22, a biconvex positive lens L23, and a biconcave negative lens L24 in the order from the object side, and the negative meniscus lens L21 located nearest to the object in the second lens group G2 is an aspherical lens with an aspherical surface made by laying a resin layer on a glass lens surface on the object side. The third lens group G3 is composed of a cemented lens of a negative meniscus lens L31 with a convex surface on the object side and a biconvex positive lens L32, and a positive meniscus lens L33 with a convex surface on the object side in the order from the object side. The fourth lens group G4 is composed of a cemented lens of a biconcave negative lens L41 and a positive meniscus lens L42 with a convex surface on the object side in the order from the object side. The fifth lens group G5 is composed of a negative meniscus lens L51 with a concave surface on the object side, and a cemented lens of a biconvex positive lens L52 and a negative meniscus lens L53 with a concave surface on the object side in the order from the object side. The stop S is located between the second lens group G2 and the third lens group G3 and moves together with the third lens group G3 upon zooming from the wide-angle end state to the telephoto end state. Focusing from a long distance to a short distance is implemented by moving the second lens group G2 in the direction toward the object.

For correcting for rotational shake of angle θ in a lens wherein the focal length of the entire system is f and wherein the anti-vibration factor (ratio of an image movement amount on the image plane to a movement amount of the moving lens group in image stabilization) is K, the moving lens group for image stabilization is moved by (f·tan θ)/K in the direction orthogonal to the optical axis. In the wide-angle end state of the second example, the anti-vibration factor is 1.22 and the focal length is 18.4 (mm); therefore, the moving distance of the fourth lens group G4 for correction for rotational shake of 0.70° is 0.18 (mm). In the telephoto end state of the second example, the anti-vibration factor is 1.80 and the focal length is 102.0 (mm); therefore, the moving distance of the fourth lens group G4 for correction for rotational shake of 0.30° is 0.30 (mm).

Table 5 below presents values of specifications in the second example.

TABLE 5

| s | r | d | ν | n |
|---|---|---|---|---|
| 1 | 141.6802 | 1.800 | 23.78 | 1.846660 |
| 2 | 68.1439 | 6.400 | 60.67 | 1.603112 |
| 3 | −10706.077 | 0.100 | | |
| 4 | 59.5915 | 4.400 | 55.52 | 1.696797 |
| 5 | 197.1533 | (d1) | | |
| *6 | 208.8051 | 0.200 | 38.09 | 1.553890 |
| 7 | 138.7145 | 1.200 | 42.72 | 1.834807 |
| 8 | 14.0334 | 5.968 | | |
| 9 | −103.8829 | 1.000 | 42.72 | 1.834807 |
| 10 | 30.7134 | 0.300 | | |
| 11 | 23.1806 | 5.400 | 23.78 | 1.846660 |
| 12 | −52.0011 | 0.402 | | |
| 13 | −37.9623 | 1.000 | 42.72 | 1.834807 |
| 14 | 234.4892 | (d2) | | |
| 15 | 0.0000 | 0.400 | | |
| 16 | 27.4176 | 0.800 | 23.78 | 1.846660 |
| 17 | 16.5023 | 3.600 | 82.52 | 1.497820 |
| 18 | −35.1294 | 0.200 | | |
| 19 | 29.3619 | 2.000 | 47.24 | 1.670029 |
| 20 | 146.7659 | (d3) | | |
| 21 | −47.7153 | 0.800 | 55.52 | 1.696797 |
| 22 | 13.7610 | 2.200 | 32.35 | 1.850260 |
| 23 | 34.5975 | (d4) | | |
| 24 | −185.9520 | 3.600 | 64.10 | 1.516800 |
| 25 | −22.8194 | 0.200 | | |
| 26 | 51.1331 | 6.500 | 70.41 | 1.487490 |
| 27 | −17.7620 | 1.200 | 32.35 | 1.850260 |
| 28 | −61.6347 | (Bf) | | |

| | W | IFL | T |
|---|---|---|---|
| f = | 18.4~ | 57.9~ | 102.0 |
| F. NO = | 3.6~ | 4.9~ | 5.5 |
| ω = | 38.8~ | 13.2~ | 7.6 |
| IH = | 14.0~ | 14.0~ | 14.0 |
| TLL = | 133.634~ | 160.510~ | 176.823 |
| Bf = | 38.500~ | 57.177~ | 64.639 |

| Focal lengths of the respective lens groups | | |
|---|---|---|
| Group | Initial surface | Focal length |
| 1 | 1 | 94.016 |
| 2 | 6 | −15.133 |
| 3 | 15 | 24.156 |
| 4 | 21 | −35.438 |
| 5 | 24 | 42.227 |

In this second example, the lens surface of the sixth surface is formed in an aspherical shape. Table 6 below shows the data of the aspherical surface, i.e., values of the radius R of curvature at the top, the conic constant κ, and the aspheric constants A4-A14.

TABLE 6

[6th surface]

| κ | A4 | A6 | A8 | A10 | A12 | A14 |
|---|---|---|---|---|---|---|
| 1.8664 | 9.45100E−06 | −2.92670E−08 | 6.55960E−11 | −7.65760E−14 | 0 | 0 |

In this second example, the following distances vary upon zooming: axial aerial gap d1 between the first lens group G1 and the second lens group G2; axial aerial gap d2 between the second lens group G2 and the third lens group G3; axial aerial gap d3 between the third lens group G3 and the fourth lens group G4; and axial aerial gap d4 between the fourth lens group G4 and the fifth lens group G5. Table 7 below shows the variable gaps at respective focal lengths in the wide-angle end state, in an intermediate focal length state, and in the telephoto end state.

TABLE 7

|  | W | IFL | T |
|---|---|---|---|
| d1 | 2.311 | 28.682 | 42.454 |
| d2 | 26.102 | 7.930 | 3.009 |
| d3 | 2.229 | 7.652 | 9.490 |
| d4 | 14.821 | 9.399 | 7.560 |

Table 8 below presents values corresponding to the respective conditions in the second example.

TABLE 8

(1)νp = 32.35
(2)Rs/(−f4) = 0.388
(3)Np − Nn = 0.153463
(4)νn − νp = 23.17
(5)f5/(−f4) = 1.19
(6)f1/(−f2) = 6.21
(7)f1/f3 = 3.89
(8)(−f2)/f3 = 0.63
(9)f4/f2 = 2.34

Figure 6A:
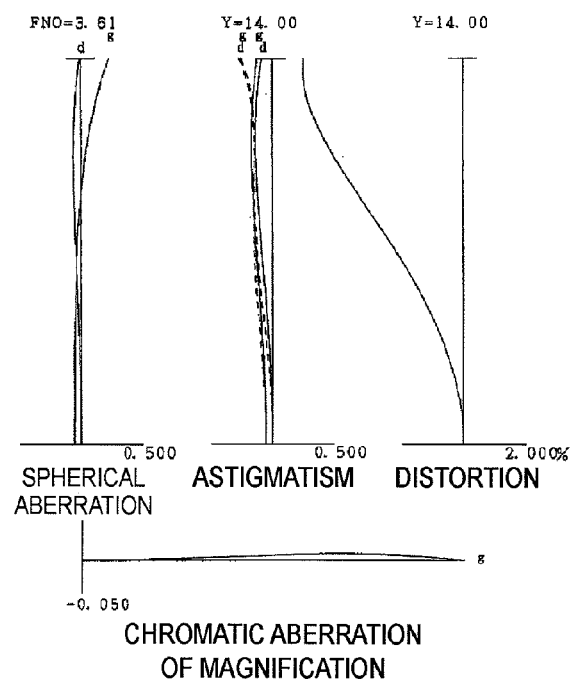
FIG. 6A is aberration diagrams of various aberrations in the second embodiment in focus at infinity in the wide-angle end state.
Figure 6A:
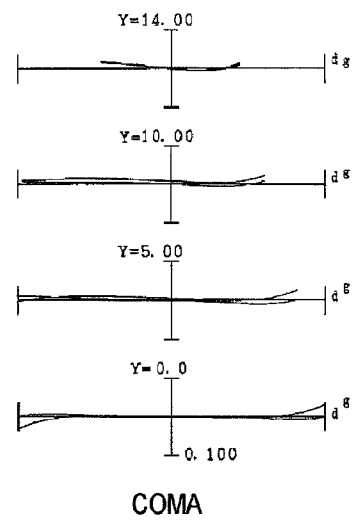
Figure 6B:
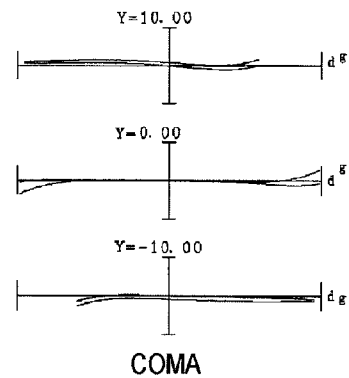
FIG. 6B is a meridional transverse aberration diagram with image stabilization against rotational shake of 0.70° in the second embodiment in the infinity photography state in the wide-angle end state.
Figure 7:
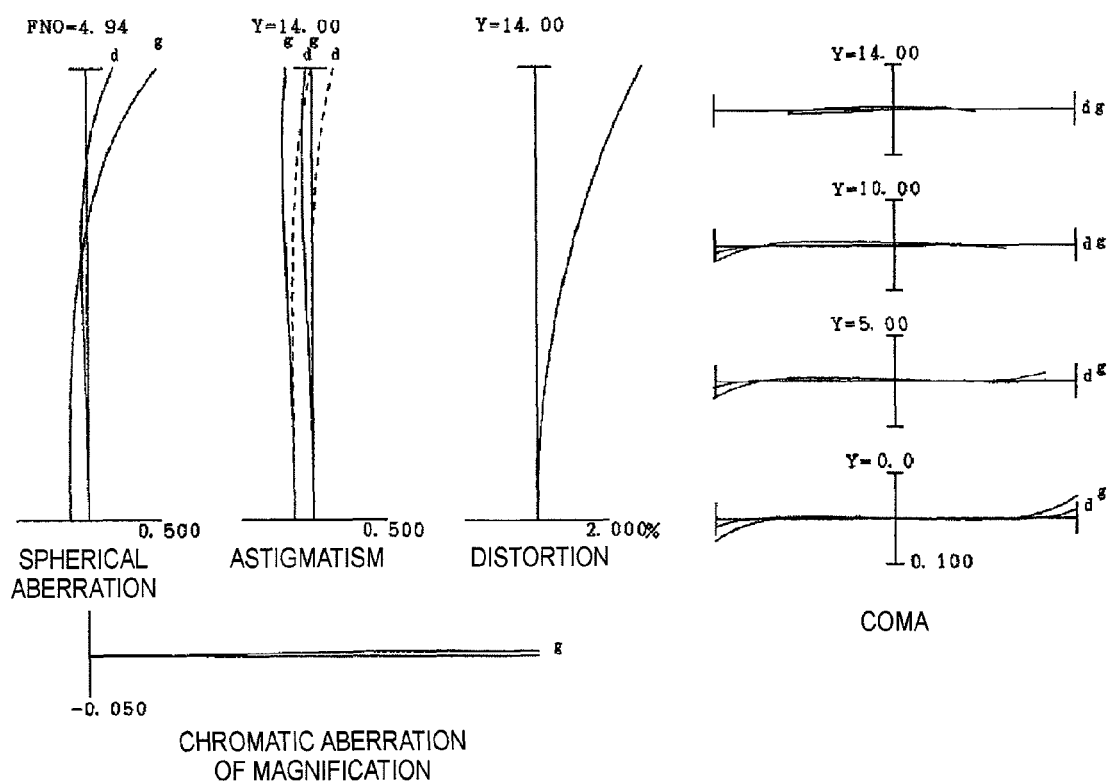
FIG. 7 is aberration diagrams in the second embodiment in focus at infinity in an intermediate focal length state.
Figure 8A:
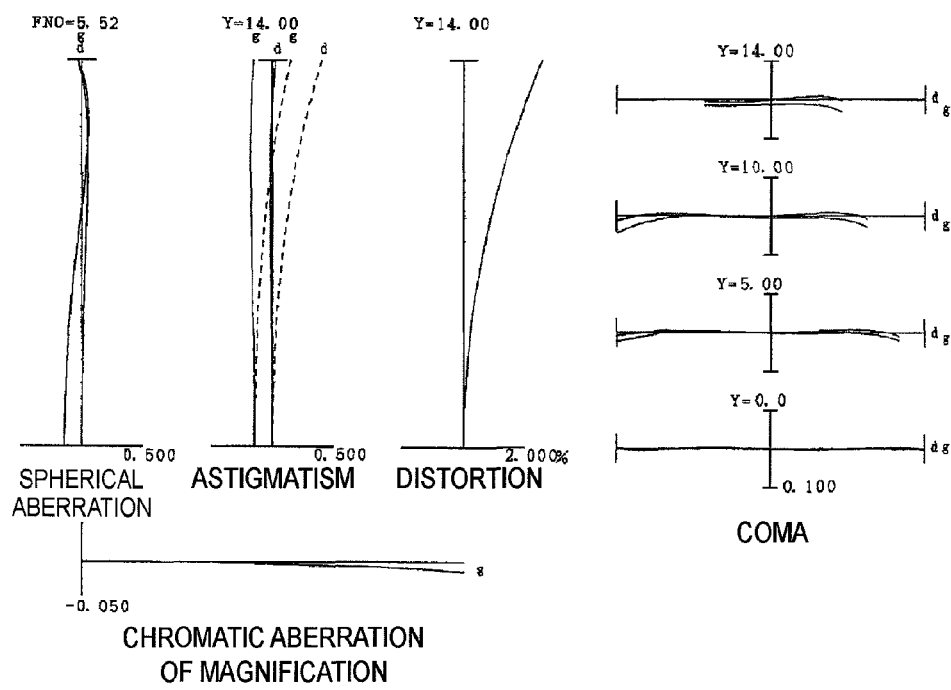
FIG. 8A is aberration diagrams of various aberrations in the second embodiment in focus at infinity in the telephoto end state.
Figure 8B:
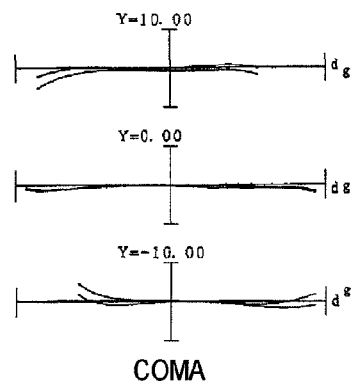
FIG. 8B is a meridional transverse aberration diagram with image stabilization against rotational shake of 0.30° in the second embodiment in the infinity photography state in the telephoto end state.

FIG. 6A shows aberration diagrams of aberrations in the second example in focus at infinity in the wide-angle end state, FIG. 7 aberration diagrams of aberrations in the second example in focus at infinity in the intermediate focal length state, and FIG. 8A aberration diagrams of aberrations in the second example in focus at infinity in the telephoto end state. Furthermore, FIG. 6B shows a meridional transverse aberration diagram with image stabilization for the rotational shake of 0.70° in the second example in the infinity photography state in the wide-angle end state, and FIG. 8B a meridional transverse aberration diagram with image stabilization for the rotational shake of 0.30° in the second example in the infinity photography state in the telephoto end state. It is clearly seen from the aberration diagrams that in the second example the zoom optical system ZL2 is corrected well for the various aberrations in each of the focal length states from the wide-angle end state to the telephoto end state and thus has excellent imaging performance.

Third Example

Figure 9:
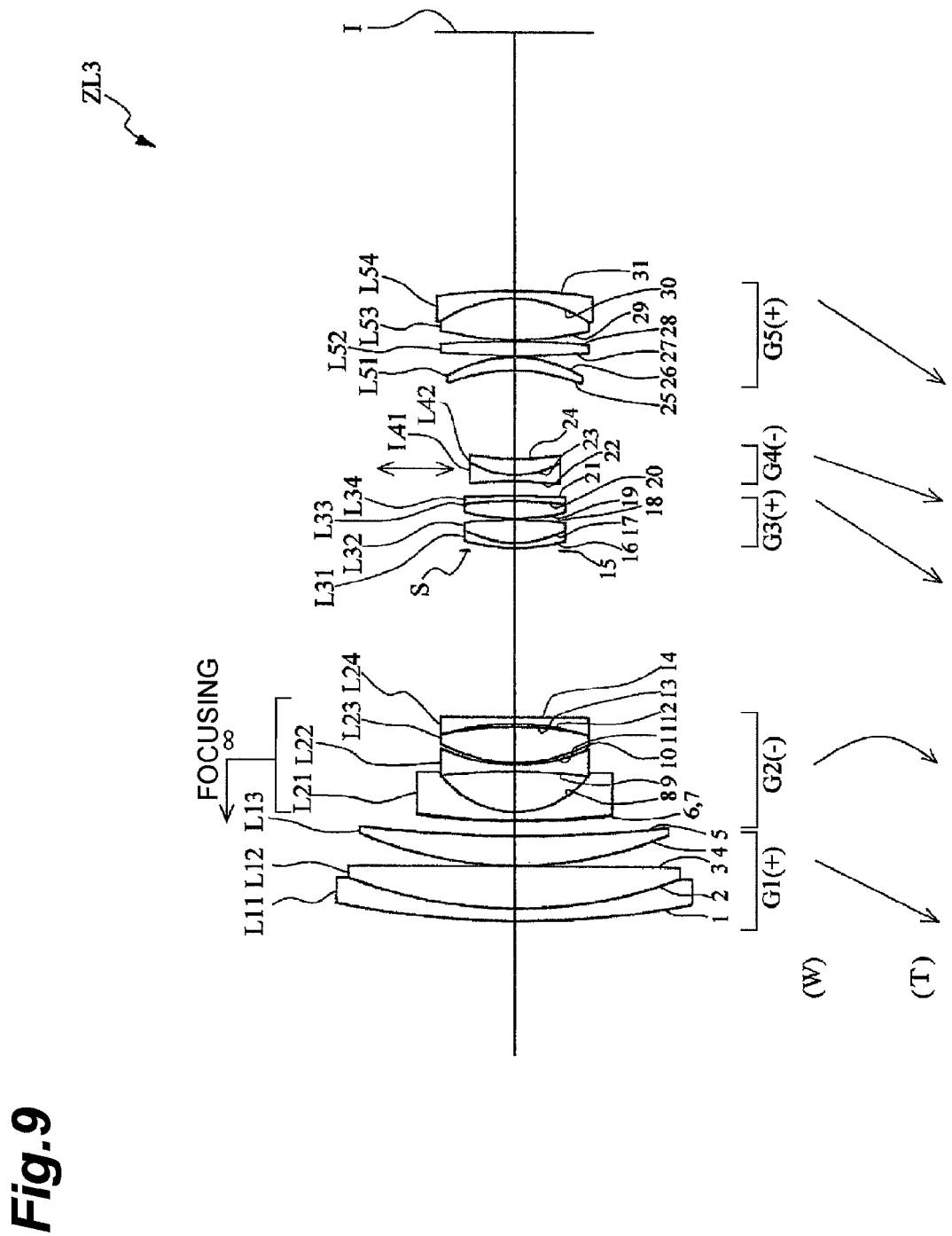
FIG. 9 is a sectional view showing a configuration of a zoom optical system according to the third embodiment.

FIG. 9 is a drawing showing the configuration of the zoom optical system ZL3 according to the third example of the present invention. In the zoom optical system ZL3 of FIG. 9, the first lens group G1 is composed of a cemented lens of a negative meniscus lens L11 with a convex surface on the object side and a biconvex positive lens L12, and a positive meniscus lens L13 with a convex surface on the object side in the order from the object side. The second lens group G2 is composed of a negative meniscus lens L21 with a convex surface on the object side, a biconcave negative lens L22, a biconvex positive lens L23, and a negative meniscus lens L24 with a concave surface on the object side in the order from the object side, and the negative meniscus lens L21 located nearest to the object in the second lens group G2 is an aspherical lens with an aspherical surface made by laying a resin layer on a glass lens surface on the object side. The third lens group G3 is composed of a cemented lens of a negative meniscus lens L31 with a convex surface on the object side and a biconvex positive lens L32, and a cemented lens of a biconvex positive lens L33 and a negative meniscus lens L34 with a concave surface on the object side in the order from the object side. The fourth lens group G4 is composed of a cemented lens of a biconcave negative lens L41 and a positive meniscus lens L42 with a convex surface on the object side in the order from the object side. The fifth lens group G5 is composed of a negative meniscus lens L51 with a concave surface on the object side, a biconvex positive lens L52, and a cemented lens of a biconvex positive lens L53 and a negative meniscus lens L54 with a concave surface on the object side in the order from the object side. The stop S is located between the second lens group G2 and the third lens group G3 and moves together with the third lens group G3 upon zooming from the wide-angle end state to the telephoto end state. Focusing from a long distance to a short distance is implemented by moving the second lens group G2 in the direction toward the object.

For correcting for rotational shake of angle θ in a lens wherein the focal length of the entire system is f and wherein the anti-vibration factor (ratio of an image movement amount on the image plane to a movement amount of the moving lens group in image stabilization) is K, the moving lens group for image stabilization is moved by (f·tan θ)/K in the direction orthogonal to the optical axis. In the wide-angle end state of the third example, the anti-vibration factor is 1.07 and the focal length is 18.4 (mm); therefore, the moving distance of the fourth lens group G4 for correction for rotational shake of 0.70° is 0.21 (mm). In the telephoto end state of the third example, the anti-vibration factor is 1.65 and the focal length is 102.0 (mm); therefore, the moving distance of the fourth lens group G4 for correction for rotational shake of 0.30° is 0.32 (mm).

Table 9 below presents values of specifications in the third example.

TABLE 9

| s | r | d | ν | n |
|---|---|---|---|---|
| 1 | 140.4724 | 1.800 | 23.78 | 1.846660 |
| 2 | 69.1021 | 6.400 | 60.67 | 1.603112 |
| 3 | −2729.7997 | 0.100 | | |
| 4 | 59.5124 | 4.400 | 55.52 | 1.696797 |
| 5 | 188.2713 | (d1) | | |

TABLE 9-continued

| | | | | |
|---|---|---|---|---|
| *6 | 149.1403 | 0.200 | 38.09 | 1.553890 |
| 7 | 114.4734 | 1.200 | 42.72 | 1.834807 |
| 8 | 13.7192 | 6.052 | | |
| 9 | −83.2727 | 1.000 | 42.72 | 1.834807 |
| 10 | 27.0187 | 0.300 | | |
| 11 | 22.4091 | 5.400 | 23.78 | 1.846660 |
| 12 | −51.6011 | 0.473 | | |
| 13 | −35.9379 | 1.000 | 42.72 | 1.834807 |
| 14 | −5104.6562 | (d2) | | |
| 15 | 0.0000 | 0.400 | | |
| 16 | 24.8451 | 0.800 | 32.35 | 1.850260 |
| 17 | 15.3912 | 3.500 | 82.52 | 1.497820 |
| 18 | −60.7317 | 0.200 | | |
| 19 | 32.4917 | 2.600 | 63.37 | 1.618000 |
| 20 | −66.3858 | 0.800 | 25.43 | 1.805181 |
| 21 | −199.4854 | (d3) | | |
| 22 | −69.6506 | 1.000 | 52.31 | 1.754999 |
| 23 | 13.7176 | 2.400 | 32.35 | 1.850260 |
| 24 | 41.6184 | (d4) | | |
| 25 | −25.6503 | 2.000 | 38.01 | 1.603420 |
| 26 | −19.0380 | 0.200 | | |
| 27 | 116.5539 | 2.200 | 61.16 | 1.589130 |
| 28 | −111.2899 | 0.200 | | |
| 29 | 47.3238 | 6.200 | 82.52 | 1.497820 |
| 30 | −18.8328 | 1.200 | 32.35 | 1.850260 |
| 31 | −75.3645 | (Bf) | | |

| | W | IFL | T |
|---|---|---|---|
| f = | 18.4~ | 59.7~ | 102.0 |
| F. NO = | 3.6~ | 5.0~ | 5.6 |
| ω = | 38.8~ | 12.9~ | 7.6 |
| IH = | 14.0~ | 14.0~ | 14.0 |
| TLL = | 133.634~ | 164.546~ | 181.070 |
| Bf = | 38.694~ | 60.376~ | 68.475 |

Focal lengths of the respective lens groups

| Group | Initial surface | Focal length |
|---|---|---|
| 1 | 1 | 92.978 |
| 2 | 6 | −14.748 |
| 3 | 15 | 25.850 |
| 4 | 22 | −40.799 |
| 5 | 25 | 42.452 |

In this third example, the lens surface of the sixth surface is formed in an aspherical shape. Table 10 below shows the data of the aspherical surface, i.e., values of the radius R of curvature at the top, the conic constant κ, and the aspheric constants A4-A14.

TABLE 10

[6th surface]

| κ | A4 | A6 | A8 | A10 | A12 | A14 |
|---|---|---|---|---|---|---|
| 5.2457 | 9.40150E−06 | −3.70290E−08 | 9.71710E−11 | −1.41200E−13 | 0 | 0 |

In this third example, the following distances vary upon zooming: axial aerial gap d1 between the first lens group G1 and the second lens group G2; axial aerial gap d2 between the second lens group G2 and the third lens group G3; axial aerial gap d3 between the third lens group G3 and the fourth lens group G4; and axial aerial gap d4 between the fourth lens group G4 and the fifth lens group G5. Table 11 below shows the variable gaps at respective focal lengths in the wide-angle end state, in an intermediate focal length state, and in the telephoto end state.

TABLE 11

| | W | IFL | T |
|---|---|---|---|
| d1 | 2.247 | 29.146 | 42.037 |
| d2 | 25.134 | 7.465 | 3.000 |
| d3 | 2.200 | 7.569 | 9.131 |
| d4 | 13.333 | 7.965 | 6.402 |

Table 12 below presents values corresponding to the respective conditions in the third example.

TABLE 12

(1)νp = 32.35
(2)Rs/(−f4) = 0.336
(3)Np − Nn = 0.095261
(4)νn − νp = 19.96
(5)f5/(−f4) = 1.04
(6)f1/(−f2) = 6.30
(7)f1/f3 = 3.60
(8)(−f2)/f3 = 0.57
(9)f4/f2 = 2.77

Figure 10A:
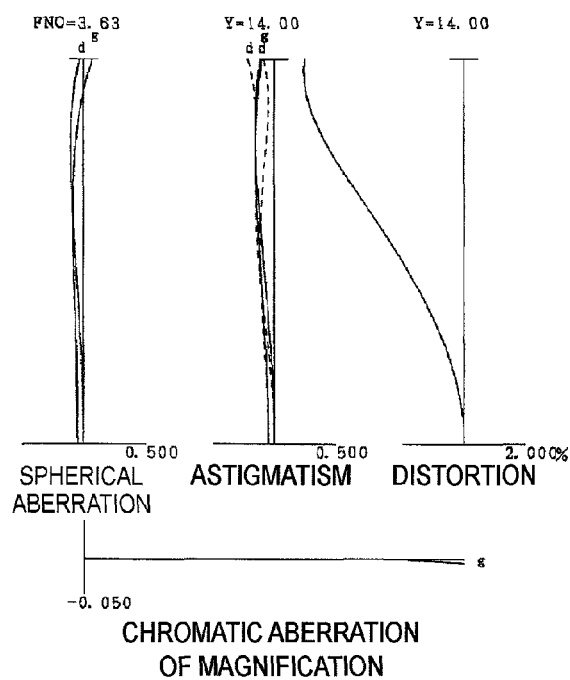
FIG. 10A is aberration diagram of various aberrations in the third embodiment in focus at infinity in the wide-angle end state.
Figure 10A:
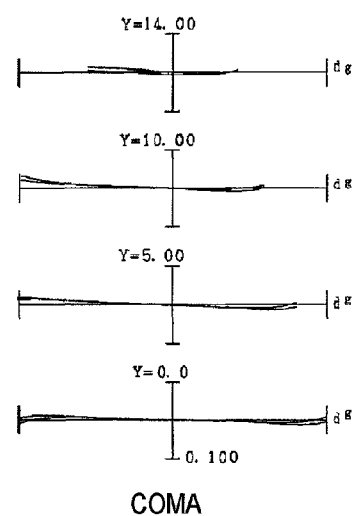
Figure 10B:
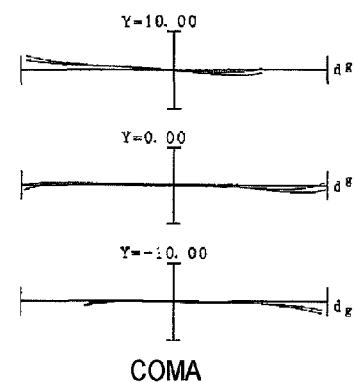
FIG. 10B is a meridional transverse aberration diagram with image stabilization against rotational shake of 0.70° in the third embodiment in the infinity photography state in the wide-angle end state.
Figure 11:
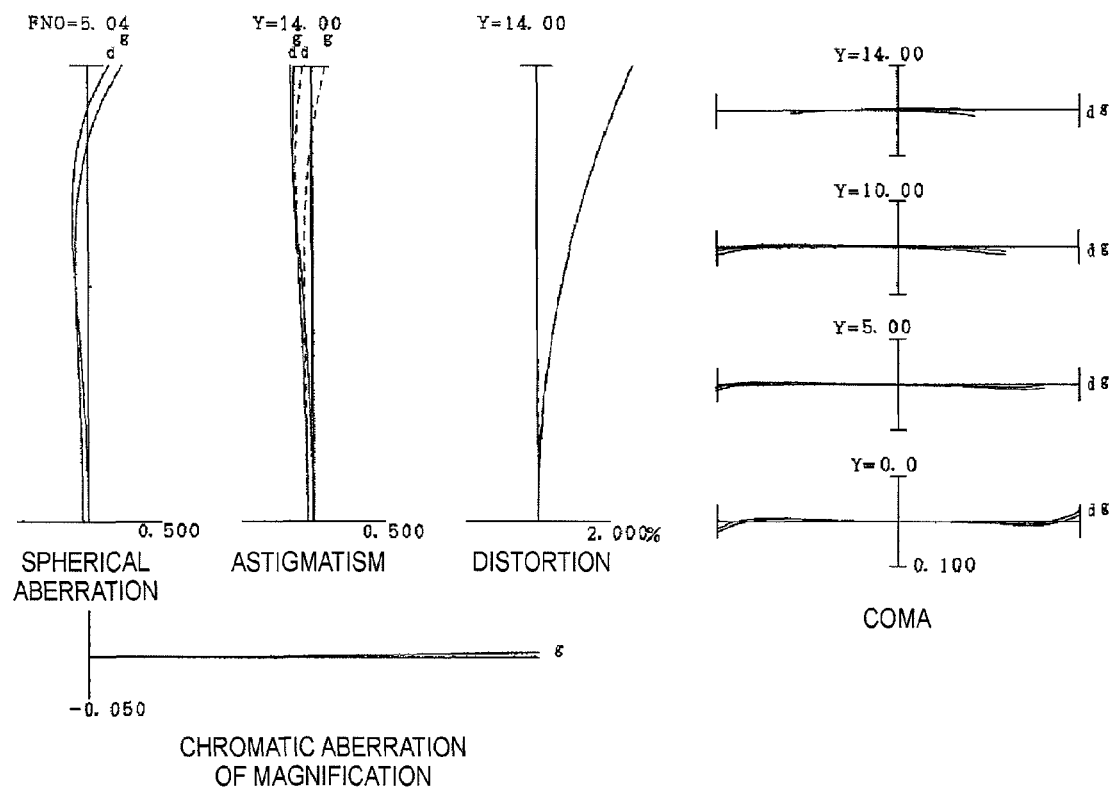
FIG. 11 is aberration diagrams in the third embodiment in focus at infinity in an intermediate focal length state.
Figure 12A:
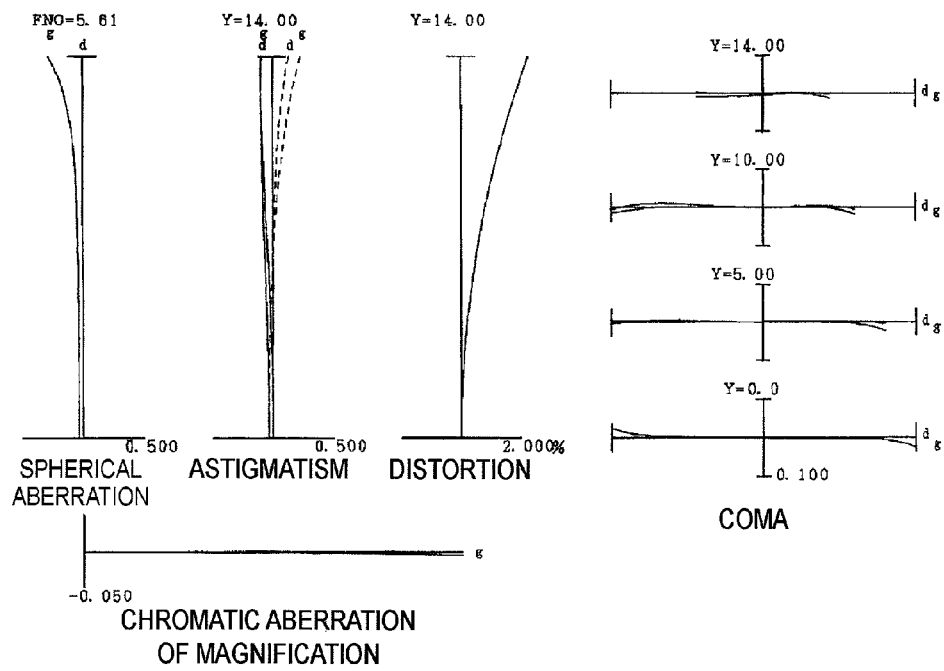
FIG. 12A is aberration diagrams of various aberrations in the third embodiment in focus at infinity in the telephoto end state.
Figure 12B:
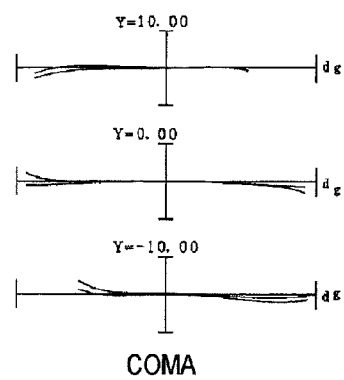
FIG. 12B is a meridional transverse aberration diagram with image stabilization against rotational shake of 0.30° in the third embodiment in the infinity photography state in the telephoto end state.

FIG. 10A shows aberration diagrams of aberrations in the third example in focus at infinity in the wide-angle end state, FIG. 11 aberration diagrams of aberrations in the third example in focus at infinity in the intermediate focal length state, and FIG. 12A aberration diagrams of aberrations in the third example in focus at infinity in the telephoto end state. Furthermore, FIG. 10B shows a meridional transverse aberration diagram with image stabilization for the rotational shake of 0.70° in the third example in the infinity photography state in the wide-angle end state, and FIG. 12B a meridional transverse aberration diagram with image stabilization for the rotational shake of 0.30° in the third example in the infinity photography state in the telephoto end state. It is clearly seen from the aberration diagrams that in the third example the zoom optical system ZL3 is corrected well for the various aberrations in each of the focal length states from the wide-angle end state to the telephoto end state and thus has excellent imaging performance.

Fourth Example

Figure 13:
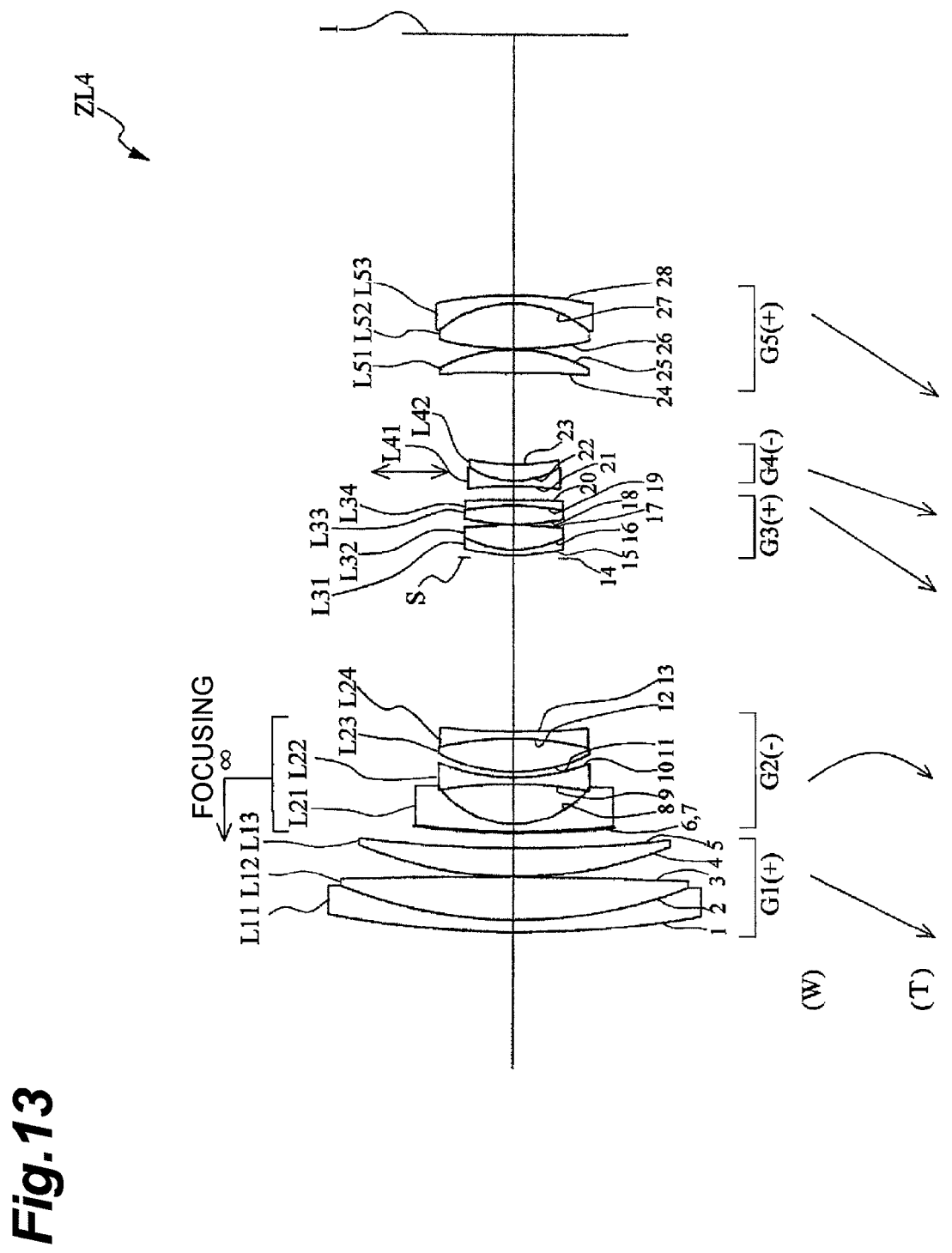
FIG. 13 is a sectional view showing a configuration of a zoom optical system according to the fourth embodiment.

FIG. 13 is a drawing showing the configuration of the zoom optical system ZL4 according to the fourth example of the present invention. In the zoom optical system ZL4 of FIG. 13, the first lens group G1 is composed of a cemented lens of a negative meniscus lens L11 with a convex surface on the object side and a biconvex positive lens L12, and a positive meniscus lens L13 with a convex surface on the object side in the order from the object side. The second lens group G2 is composed of a negative meniscus lens L21 with a convex surface on the object side, a biconcave negative lens L22, and a cemented lens of a biconvex positive lens L23 and a biconcave negative lens L24 in the order from the object side, and the negative meniscus lens L21 located nearest to the object in the second lens group G2 is an aspherical lens with an aspherical surface made by laying a resin layer on a glass lens surface on the object side. The third lens group G3 is composed of a cemented lens of a negative meniscus lens L31 with a convex surface on the object side and a biconvex positive lens L32, and a cemented lens of a biconvex positive lens L33 and a negative meniscus lens L34 with a concave surface on the object side in the order from the object side. The fourth lens group G4 is composed of a cemented lens of a biconcave negative lens L41 and a positive meniscus lens L42 with a convex surface on the object side in the order from the object side. The fifth lens group G5 is composed of a positive meniscus lens L51 with a concave surface on the object side, and a cemented lens of a biconvex positive lens L52 and a negative meniscus lens L53 with a concave surface on the object side in the order from the object side. The stop S is located between the second lens group G2 and the third lens group G3 and moves together with the third lens group G3 upon zooming from the wide-angle end state to the telephoto end state. Focusing from a long distance to a short distance is implemented by moving the second lens group G2 in the direction toward the object.

For correcting for rotational shake of angle θ in a lens wherein the focal length of the entire system is f and wherein the anti-vibration factor (ratio of an image movement amount on the image plane to a movement amount of the moving lens group in image stabilization) is K, the moving lens group for image stabilization is moved by (f·tan θ)/K in the direction orthogonal to the optical axis. In the wide-angle end state of the fourth example, the anti-vibration factor is 1.21 and the focal length is 18.4 (mm); therefore, the moving distance of the fourth lens group G4 for correction for rotational shake of 0.70° is 0.19 (mm). In the telephoto end state of the fourth example, the anti-vibration factor is 1.80 and the focal length is 102.0 (mm); therefore, the moving distance of the fourth lens group G4 for correction for rotational shake of 0.30° is 0.30 (mm).

Table 13 below presents values of specifications in the fourth example.

TABLE 13

| s | r | d | ν | n |
|---|---|---|---|---|
| 1 | 149.2049 | 1.800 | 23.78 | 1.846660 |
| 2 | 69.8832 | 6.400 | 60.68 | 1.603110 |
| 3 | −666.6667 | 0.100 | | |
| 4 | 61.0570 | 4.200 | 55.52 | 1.696797 |
| 5 | 194.4178 | (d1) | | |
| *6 | 119.8559 | 0.200 | 38.09 | 1.553890 |
| 7 | 123.4568 | 1.200 | 42.72 | 1.834807 |
| 8 | 14.3552 | 5.900 | | |
| 9 | −66.8772 | 1.000 | 42.72 | 1.834807 |
| 10 | 30.5641 | 0.800 | | |
| 11 | 24.6081 | 5.000 | 23.78 | 1.846660 |
| 12 | −46.9492 | 1.000 | 42.72 | 1.834810 |
| 13 | 105.8367 | (d2) | | |
| 14 | 0.0000 | 0.400 | | |
| 15 | 28.3977 | 0.900 | 28.69 | 1.795040 |
| 16 | 16.3649 | 3.600 | 82.52 | 1.497820 |
| 17 | −62.6784 | 0.100 | | |

TABLE 13-continued

| 18 | 35.0000 | 2.800 | 49.61 | 1.772500 |
|---|---|---|---|---|
| 19 | −35.0000 | 0.800 | 32.35 | 1.850260 |
| 20 | −200.0000 | (d3) | | |
| 21 | −58.5686 | 0.800 | 54.66 | 1.729157 |
| 22 | 12.6629 | 2.400 | 32.35 | 1.850260 |
| 23 | 34.2136 | (d4) | | |
| 24 | −243.8316 | 3.400 | 70.45 | 1.487490 |
| 25 | −23.3450 | 0.100 | | |
| 26 | 51.7327 | 6.800 | 70.41 | 1.487490 |
| 27 | −17.3098 | 1.200 | 32.35 | 1.850260 |
| 28 | −53.1334 | (Bf) | | |

| | W | IFL | T |
|---|---|---|---|
| f = | 18.4~ | 56.0~ | 102.0 |
| F. NO = | 3.6~ | 5.2~ | 5.9 |
| ω = | 38.8~ | 13.6~ | 7.6 |
| IH = | 14.0~ | 14.0~ | 14.0 |
| TLL = | 133.418~ | 159.942~ | 177.111 |
| Bf = | 38.655~ | 57.579~ | 65.718 |

Focal lengths of the respective lens groups

| Group | Initial surface | Focal length |
|---|---|---|
| 1 | 1 | 91.399 |
| 2 | 6 | −14.924 |
| 3 | 14 | 24.588 |
| 4 | 21 | −35.821 |
| 5 | 24 | 41.672 |

In this fourth example, the lens surface of the sixth surface is formed in an aspherical shape. Table 14 below shows the data of the aspherical surface, i.e., values of the radius R of curvature at the top, the conic constant κ, and the aspheric constants A4-A14.

TABLE 14

| | [6th surface] | | | | | |
|---|---|---|---|---|---|---|
| κ | A4 | A6 | A8 | A10 | A12 | A14 |
| 57.5466 | −1.32090E−06 | −5.88330E−08 | 2.88370E−10 | −9.25870E−13 | 0 | 0 |

In this fourth example, the following distances vary upon zooming: axial aerial gap d1 between the first lens group G1 and the second lens group G2; axial aerial gap d2 between the second lens group G2 and the third lens group G3; axial aerial gap d3 between the third lens group G3 and the fourth lens group G4; and axial aerial gap d4 between the fourth lens group G4 and the fifth lens group G5. Table 15 below shows the variable gaps at respective focal lengths in the wide-angle end state, in an intermediate focal length state, and in the telephoto end state.

TABLE 15

| | W | IFL | T |
|---|---|---|---|
| d1 | 2.285 | 27.419 | 41.691 |
| d2 | 25.754 | 8.221 | 2.978 |
| d3 | 2.124 | 6.971 | 8.672 |
| d4 | 13.699 | 8.852 | 7.150 |

Table 16 below presents values corresponding to the respective conditions in the fourth example.

TABLE 16

(1) νp = 32.35
(2) Rs/(−f4) = 0.354
(3) Np − Nn = 0.121103
(4) νn − νp = 22.31
(5) f5/(−f4) = 1.16
(6) f1/(−f2) = 6.12
(7) f1/f3 = 3.72
(8) (−f2)/f3 = 0.61
(9) f4/f2 = 2.40

Figure 14A:
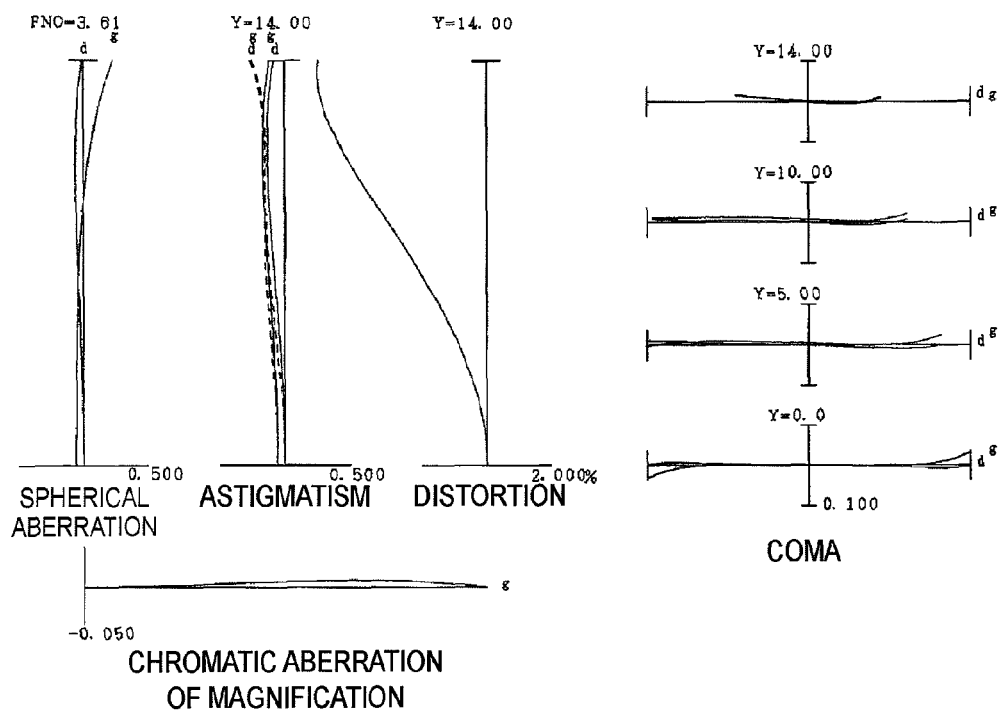
FIG. 14A is aberration diagrams of various aberrations in the fourth embodiment in focus at infinity in the wide-angle end state.
Figure 14B:
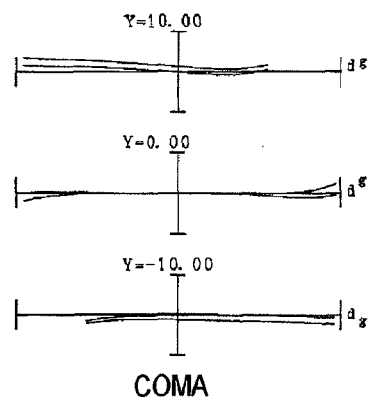
FIG. 14B is a meridional transverse aberration diagram with image stabilization against rotational shake of 0.70° in the fourth embodiment in the infinity photography state in the wide-angle end state.
Figure 15:
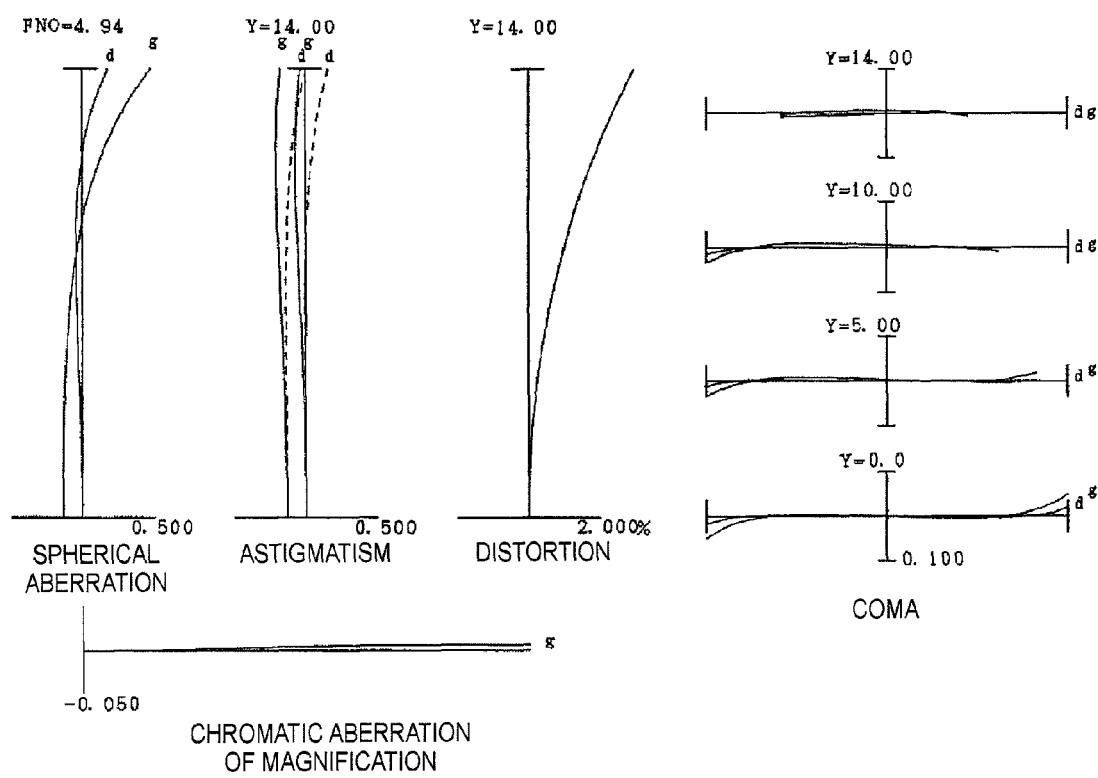
FIG. 15 is aberration diagrams in the fourth embodiment in focus at infinity in an intermediate focal length state.
Figure 16A:
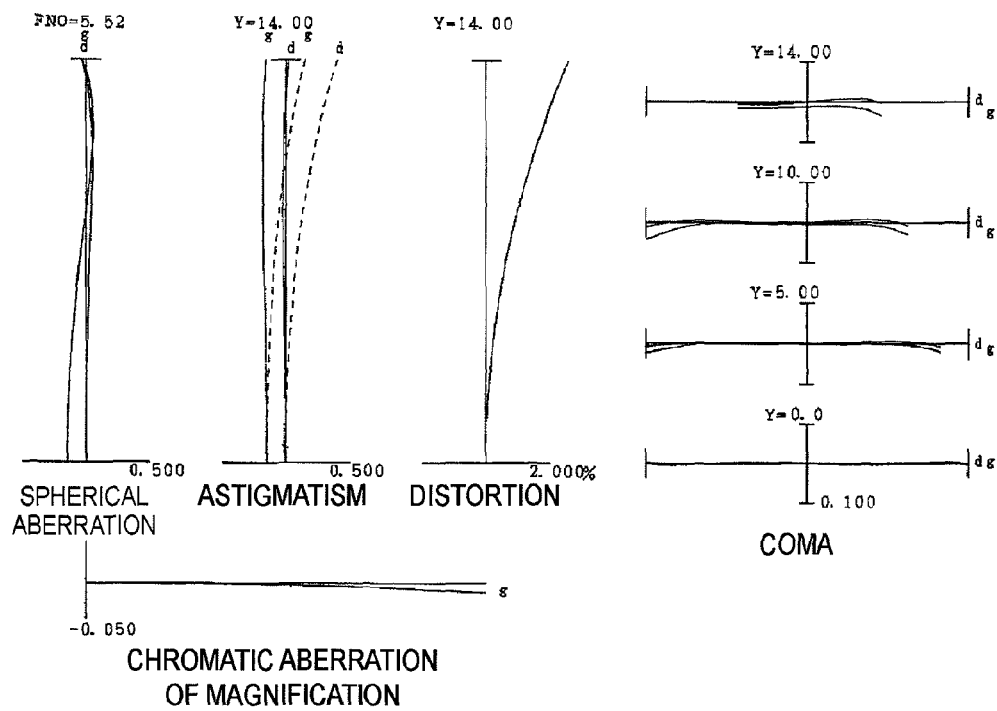
FIG. 16A is aberration diagrams of various aberrations in the fourth embodiment in focus at infinity in the telephoto end state.
Figure 16B:
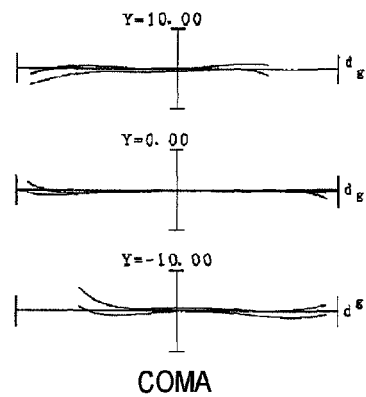
FIG. 16B is a meridional transverse aberration diagram with image stabilization against rotational shake of 0.30° in the fourth embodiment in the infinity photography state in the telephoto end state.

FIG. 14A shows aberration diagrams of aberrations in the fourth example in focus at infinity in the wide-angle end state, FIG. 15 aberration diagrams of aberrations in the fourth example in focus at infinity in the intermediate focal length state, and FIG. 16A aberration diagrams of aberrations in the fourth example in focus at infinity in the telephoto end state. Furthermore, FIG. 14B shows a meridional transverse aberration diagram with image stabilization for the rotational shake of 0.70° in the fourth example in the infinity photography state in the wide-angle end state, and FIG. 16B a meridional transverse aberration diagram with image stabilization for the rotational shake of 0.30° in the fourth example in the infinity photography state in the telephoto end state. It is clearly seen from the aberration diagrams that in the fourth example the zoom optical system ZL4 is corrected well for the various aberrations in each of the focal length states from the wide-angle end state to the telephoto end state and thus has excellent imaging performance.

Fifth Example

Figure 17:
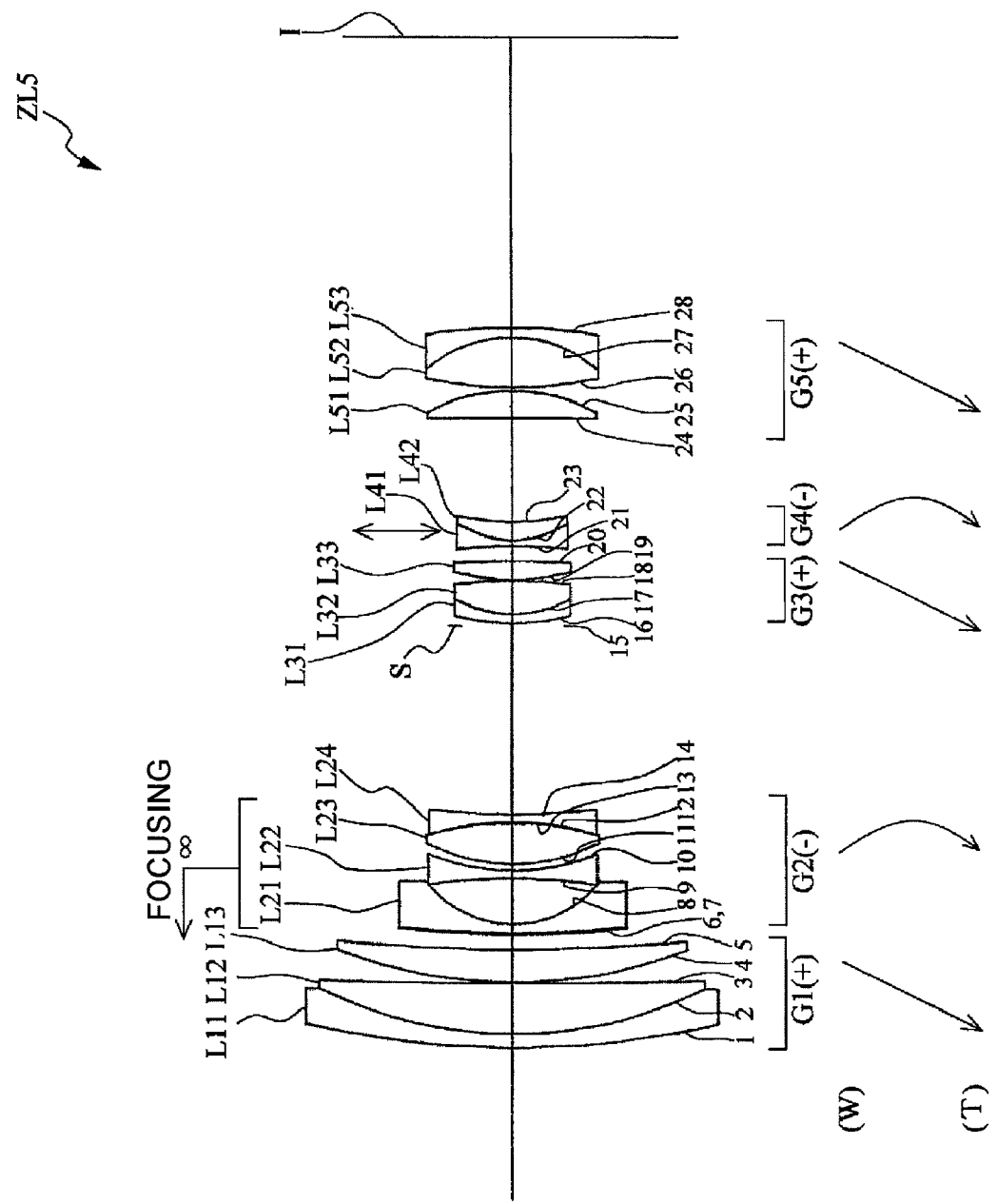
FIG. 17 is a sectional view showing a configuration of a zoom optical system according to the fifth embodiment.

FIG. 17 is a drawing showing the configuration of the zoom optical system ZL5 according to the fifth example of the present invention. In the zoom optical system ZL5 of FIG. 17, the first lens group G1 is composed of a cemented lens of a negative meniscus lens L11 with a convex surface on the object side and a positive meniscus lens L12 with a convex surface on the object side, and a positive meniscus lens L13 with a convex surface on the object side in the order from the object side. The second lens group G2 is composed of a negative meniscus lens L21 with a convex surface on the object side, a biconcave negative lens L22, a biconvex positive lens L23, and a biconcave negative lens L24 in the order from the object side, and the negative meniscus lens L21 located nearest to the object in the second lens group G2 is an aspherical lens with an aspherical surface made by laying a resin layer on a glass lens surface on the object side. The third lens group G3 is composed of a cemented lens of a negative meniscus lens L31 with a convex surface on the object side and a biconvex positive lens L32, and a biconvex positive lens L33 in the order from the object side. The fourth lens group G4 is composed of a cemented lens of a biconcave negative lens L41 and a positive meniscus lens L42 with a convex surface on the object side in the order from the object side. The fifth lens group G5 is composed of a positive meniscus lens L51 with a concave surface on the object side, and a cemented lens of a biconvex positive lens L52 and a negative meniscus lens L53 with a concave surface on the object side in the order from the object side. The stop S is located between the second lens group G2 and the third lens group G3 and moves together with the third lens group G3 upon zooming from the wide-angle end state to the telephoto end state. Focusing from a long distance to a short distance is implemented by moving the second lens group G2 in the direction toward the object.

For correcting for rotational shake of angle θ in a lens wherein the focal length of the entire system is f and wherein the anti-vibration factor (ratio of an image movement amount on the image plane to a movement amount of the moving lens group in image stabilization) is K, the moving lens group for image stabilization is moved by (f·tan θ)/K in the direction orthogonal to the optical axis. In the wide-angle end state of the fifth example, the anti-vibration factor is 1.23 and the focal length is 18.4 (mm); therefore, the moving distance of the fourth lens group G4 for correction for rotational shake of 0.70° is 0.18 (mm). In the telephoto end state of the fifth example, the anti-vibration factor is 1.84 and the focal length is 102.0 (mm); therefore, the moving distance of the fourth lens group G4 for correction for rotational shake of 0.30° is 0.29 (mm).

Table 17 below presents values of specifications in the fifth example.

TABLE 17

| s | r | d | ν | n |
|---|---|---|---|---|
| 1 | 123.0748 | 1.800 | 25.43 | 1.805180 |
| 2 | 58.2630 | 6.650 | 60.68 | 1.603110 |
| 3 | 1138.2722 | 0.100 | | |
| 4 | 63.1334 | 4.400 | 55.52 | 1.696800 |
| 5 | 263.2418 | (d1) | | |
| *6 | 161.2961 | 0.200 | 38.09 | 1.553890 |
| 7 | 135.3684 | 1.200 | 40.94 | 1.806100 |
| 8 | 14.0958 | 6.050 | | |
| 9 | −74.9323 | 1.000 | 40.94 | 1.806100 |
| 10 | 28.3988 | 0.850 | | |
| 11 | 23.8014 | 5.500 | 23.78 | 1.846660 |
| 12 | −38.6530 | 0.200 | | |
| 13 | −33.8807 | 1.000 | 40.94 | 1.806100 |
| 14 | 94.5733 | (d2) | | |
| 15 | 0.0000 | 0.400 | | |
| 16 | 31.0087 | 1.200 | 27.51 | 1.755200 |
| 17 | 15.8999 | 4.400 | 82.56 | 1.497820 |
| 18 | −53.0423 | 0.100 | | |
| 19 | 28.4992 | 2.500 | 63.38 | 1.618000 |
| 20 | −146.7709 | (d3) | | |
| 21 | −57.7504 | 0.800 | 54.66 | 1.729160 |
| 22 | 13.0400 | 2.400 | 32.35 | 1.850260 |
| 23 | 35.6734 | (d4) | | |
| 24 | −262.4339 | 3.500 | 64.12 | 1.516800 |
| 25 | −22.7054 | 0.400 | | |
| 26 | 51.9563 | 6.700 | 70.45 | 1.487490 |
| 27 | −16.7199 | 1.200 | 32.35 | 1.850260 |
| 28 | −68.5435 | (Bf) | | |

| | W | IFL | T |
|---|---|---|---|
| f = | 18.4~ | 57.4~ | 102.0 |
| F. NO = | 3.6~ | 5.2~ | 5.8 |
| ω = | 38.8~ | 13.2~ | 7.6 |
| IH = | 14.0~ | 14.0~ | 14.0 |
| TLL = | 133.573~ | 161.813~ | 178.604 |
| Bf = | 38.310~ | 58.032~ | 65.481 |

| Focal lengths of the respective lens groups | | |
|---|---|---|
| Group | Initial surface | Focal length |
| 1 | 1 | 91.792 |
| 2 | 6 | −14.310 |
| 3 | 14 | 23.831 |
| 4 | 21 | −36.549 |
| 5 | 24 | 45.130 |

In this fifth example, the lens surface of the sixth surface is formed in an aspherical shape. Table 18 below shows the data of the aspherical surface, i.e., values of the radius R of curvature at the top, the conic constant κ, and the aspheric constants A4–A14.

TABLE 18

| | | | [6th surface] | | | |
|---|---|---|---|---|---|---|
| κ | A4 | A6 | A8 | A10 | A12 | A14 |
| 87.2734 | 4.40790E−06 | −3.55660E−08 | 1.04050E−10 | −2.45810E−13 | 0 | 0 |

In this fifth example, the following distances vary upon zooming: axial aerial gap d1 between the first lens group G1 and the second lens group G2; axial aerial gap d2 between the second lens group G2 and the third lens group G3; axial aerial gap d3 between the third lens group G3 and the fourth lens group G4; and axial aerial gap d4 between the fourth lens group G4 and the fifth lens group G5. Table 19 below shows the variable gaps at respective focal lengths in the wide-angle end state, in an intermediate focal length state, and in the telephoto end state.

TABLE 19

| | W | IFL | T |
|---|---|---|---|
| d1 | 1.925 | 27.504 | 41.483 |
| d2 | 24.941 | 7.881 | 3.243 |
| d3 | 2.033 | 7.048 | 8.771 |
| d4 | 13.813 | 8.798 | 7.075 |

Table 20 below presents values corresponding to the respective conditions in the fifth example.

TABLE 20

(1)νp = 32.35
(2)Rs/(−f4) = 0.357
(3)Np − Nn = 0.121103
(4)νn − νp = 22.31
(5)f5/(−f4) = 1.24
(6)f1/(−f2) = 6.41
(7)f1/f3 = 3.85
(8)(−f2)/f3 = 0.60
(9)f4/f2 = 2.55

Figure 18A:
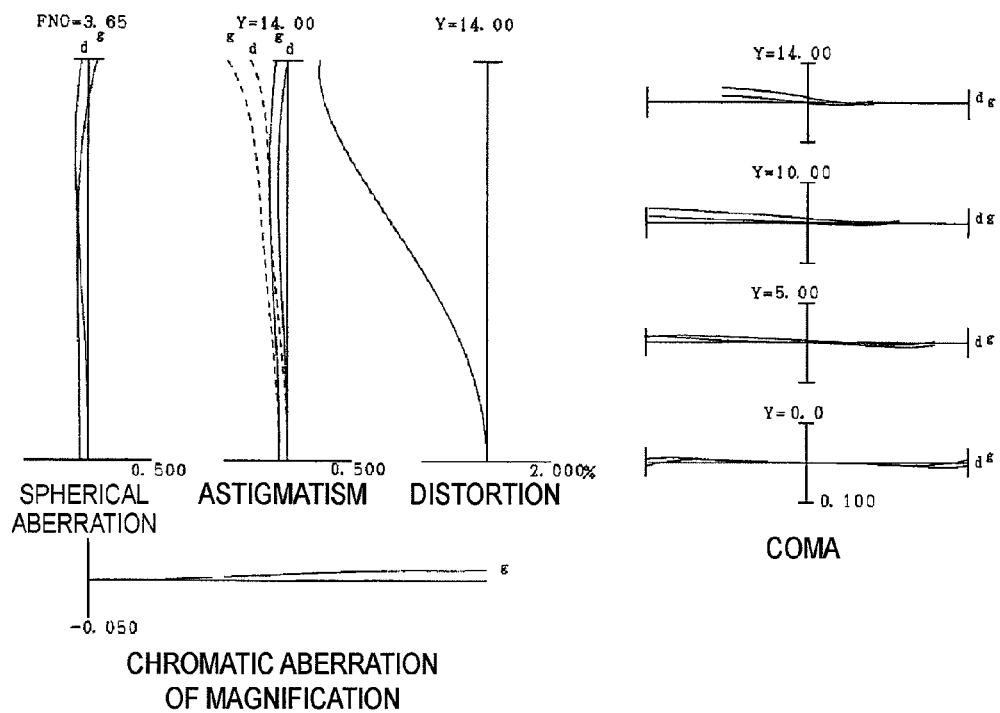
FIG. 18A is aberration diagrams of various aberrations in the fifth embodiment in focus at infinity in the wide-angle end state.
Figure 18B:
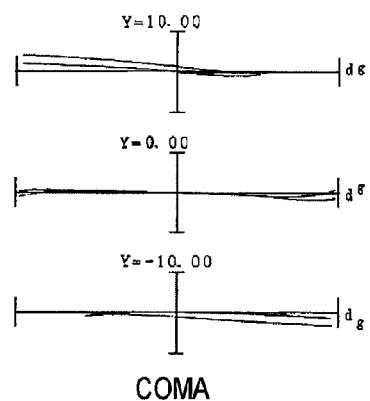
FIG. 18B is a meridional transverse aberration diagram with image stabilization against rotational shake of 0.70° in the fifth embodiment in the infinity photography state in the wide-angle end state.
Figure 19:
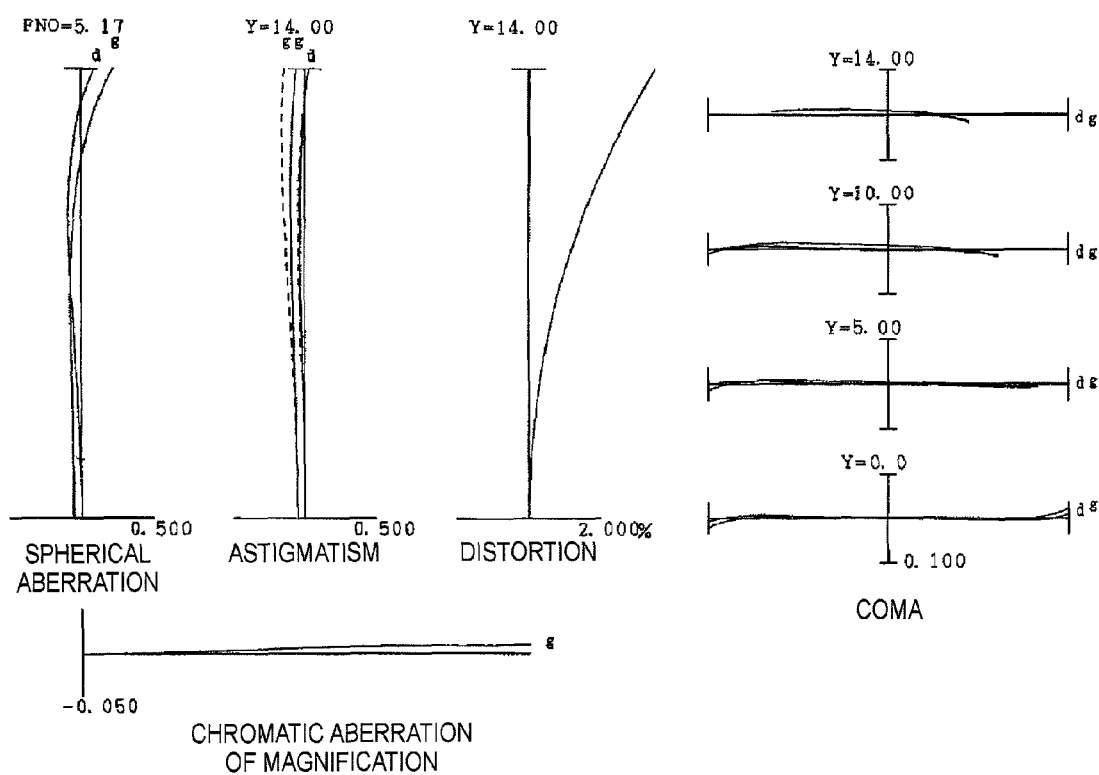
FIG. 19 is aberration diagrams in the fifth embodiment in focus at infinity in an intermediate focal length state.
Figure 20A:
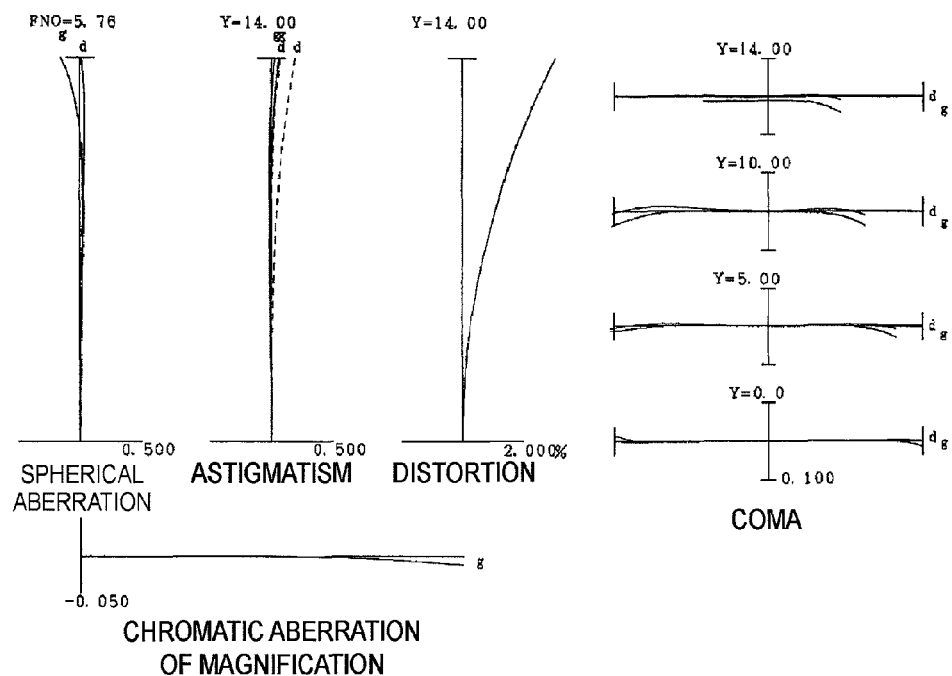
FIG. 20A is aberration diagrams of various aberrations in the fifth embodiment in focus at infinity in the telephoto end state.
Figure 20B:
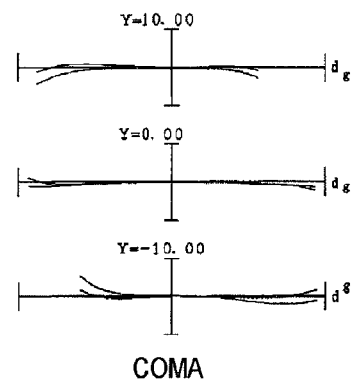
FIG. 20B is a meridional transverse aberration diagram with image stabilization against rotational shake of 0.30° in the fifth embodiment in the infinity photography state in the telephoto end state.

FIG. 18A shows aberration diagrams of aberrations in the fifth example in focus at infinity in the wide-angle end state, FIG. 19 aberration diagrams of aberrations in the fifth example in focus at infinity in the intermediate focal length state, and FIG. 18A aberration diagrams of aberrations in the fifth example in focus at infinity in the telephoto end state. Furthermore, FIG. 18B shows a meridional transverse aberration diagram with image stabilization for the rotational shake of 0.70° in the fifth example in the infinity photography state in the wide-angle end state, and FIG. 20B a meridional transverse aberration diagram with image stabilization for the rotational shake of 0.30° in the fifth example in the infinity photography state in the telephoto end state. It is clearly seen from the aberration diagrams that in the fifth example the zoom optical system ZL5 is corrected well for the various aberrations in each of the focal length states from the wide-angle end state to the telephoto end state and thus has excellent imaging performance.

The invention is not limited to the foregoing embodiments but various changes and modifications of its components may be made without departing from the scope of the present invention. Also, the components disclosed in the embodiments may be assembled in any combination for embodying the present invention. For example, some of the components may be omitted from all components disclosed in the embodiments. Further, components in different embodiments may be appropriately combined.

What is claimed is:

1. A zoom optical system comprising, in the order from an object side:
   a first lens group having a positive refracting power;
   a second lens group having a negative refracting power;
   a third lens group having a positive refracting power;
   a fourth lens group having a negative refracting power; and
   a fifth lens group having a positive refracting power,
   wherein the fourth lens group has a cemented lens of a negative lens and a positive lens in the order from the object side, and wherein a condition of the following expression is satisfied:

νp>30.0, where νp is an Abbe number of said positive lens, and
   wherein at least a part of the fourth lens group is moved in a direction orthogonal to an optical axis.

2. The zoom optical system according to claim 1, wherein the positive lens of the cemented lens has an object-side lens surface of a convex shape on the object side.

3. An optical instrument comprising the zoom optical system as set forth in claim 1.

4. A zoom optical system comprising, in the order from an object side:
   a first lens group having a positive refracting power;
   a second lens group having a negative refracting power;
   a third lens group having a positive refracting power;
   a fourth lens group having a negative refracting power; and
   a fifth lens group having a positive refracting power,
   wherein at least a part of the fourth lens group is moved in a direction orthogonal to the optical axis, and
   wherein a condition of the following expression is satisfied:

1.0<f4/f2<3.0, where f2 is a focal length of the second lens group and f4 is a focal length of the fourth lens group, and
   wherein a condition of the following expression is satisfied:

1.0<f5/(−f4)<2.0, where f4 is a focal length of the fourth lens group and f5 is a focal length of the fifth lens group.

5. The zoom optical system according to claim 4, wherein a condition of the following expression is satisfied:

0.4<(−f2)/f3<0.9, where f2 is a focal length of the second lens group and f3 is a focal length of the third lens group.

6. The zoom optical system according to claim 4, wherein a condition of the following expression is satisfied:

3.0<f1/(−f2)<6.9, where f1 is a focal length of the first lens group and f2 is a focal length of the second lens group.

7. The zoom optical system according to claim 4, wherein a condition of the following expression is satisfied:

$$2.0 < f1/f3 < 4.7,$$

where f1 is a focal length of the first lens group and f3 is a focal length of the third lens group.

8. The zoom optical system according to claim 4, wherein upon zooming from a wide-angle end state to a telephoto end state, a distance between the first lens group and the second lens group increases, a distance between the second lens group and the third lens group decreases, a distance between the third lens group and the fourth lens group increases, and a distance between the fourth lens group and the fifth lens group decreases.

9. The zoom optical system according to claim 4, wherein upon zooming from a wide-angle end state to a telephoto end state, the first lens group, the third lens group, and the fifth lens group move in a direction toward an object, and wherein a moving distance of the third lens group and a moving distance of the fifth lens group are equal.

10. A zoom optical system comprising, in the order from an object side:
a first lens group having a positive refracting power;
a second lens group having a negative refracting power;
a third lens group having a positive refracting power;
a fourth lens group having a negative refracting power; and
a fifth lens group having a positive refracting power,
wherein at least a part of the fourth lens group is moved in a direction orthogonal to the optical axis, and
wherein a condition of the following expression is satisfied:

$$1.0 < f4/f2 < 3.0,$$

where f2 is a focal length of the second lens group and f4 is a focal length of the fourth lens group, and
wherein the fourth lens group has a cemented lens of a negative lens and a positive lens in the order from the object side.

11. The zoom optical system according to claim 10, wherein only the cemented lens is moved in a direction orthogonal to an optical axis.

12. The zoom optical system according to claim 10, wherein a condition of the following expression is satisfied:

$$vp > 30.0,$$

where vp is an Abbe number of the positive lens of the cemented lens.

13. The zoom optical system according to claim 10, wherein a condition of the following expression is satisfied:

$$0.25 < Rs/(-f4) < 0.45,$$

where Rs is a radius of curvature of a cemented surface of the cemented lens and f4 is a focal length of the fourth lens group.

14. The zoom optical system according to claim 10, wherein a condition of the following expression is satisfied:

$$0.07 < Np - Nn < 0.20,$$

where Np is a d-line refractive index of the positive lens of the cemented lens and Nn is a d-line refractive index of the negative lens of the cemented lens.

15. The zoom optical system according to claim 10, wherein a condition of the following expression is satisfied:

$$15 < vn - vp < 27,$$

where vp is an Abbe number of the positive lens of the cemented lens and vn is an Abbe number of the negative lens of the cemented lens.

16. The zoom optical system according to claim 10, wherein the cemented lens is comprised of a cemented lens of a biconcave lens and a positive meniscus lens with a convex surface on the object side in the order from the object side.

17. The zoom optical system according to claim 10, wherein at least one surface of a lens in the second lens group is formed in an aspherical shape.

18. A method of manufacturing a zoom optical system, comprising the step of:
arranging a first lens group having a positive refracting power, a second lens group having a negative refracting power, a third lens group having a positive refracting power, a fourth lens group having a negative refracting power, and a fifth lens group having a positive refracting power, in the order from an object side;
wherein the fourth lens group has a cemented lens of a negative lens and a positive lens in the order from the object side, and wherein a condition of the following expression is satisfied: vp>30.0,
where vp is an Abbe number of said positive lens, and
wherein at least a part of the fourth lens group is moved in a direction orthogonal to an optical axis.

19. The method of manufacturing a zoom optical system according to claim 18, wherein the positive lens of the cemented lens has an object-side lens surface of a convex shape on the object side.

20. A method of manufacturing a zoom optical system, comprising the steps of:
arranging a first lens group having a positive refracting power, a second lens group having a negative refracting power, a third lens group having a positive refracting power, a fourth lens group having a negative refracting power, and a fifth lens group having a positive refracting power, in the order from an object side; and
moving at least a part of the fourth lens group in a direction orthogonal to an optical axis,
wherein a condition of the following expression is satisfied:

$$1.0 < f4/f2 < 3.0,$$

where f2 is a focal length of the second lens group and f4 is a focal length of the fourth lens group, and
wherein a condition of the following expression is satisfied:

$$1.0 < f5/(-f4) < 2.0,$$

where f4 is a focal length of the fourth lens group and f5 is a focal length of the fifth lens group.

21. The method of manufacturing a zoom optical system according to claim 20, wherein a condition of the following expression is satisfied:

$$0.4 < (-f2)/f3 < 0.9,$$

where f2 is a focal length of the second lens group and f3 is a focal length of the third lens group.

22. The method of manufacturing a zoom optical system according to claim 20, wherein a condition of the following expression is satisfied:

$$3.0 < f1/(-f2) < 6.9,$$

where f1 is a focal length of the first lens group and f2 is a focal length of the second lens group.

23. The method of manufacturing a zoom optical system according to claim 20, wherein a condition of the following expression is satisfied:

$$2.0 < f1/f3 < 4.7,$$

where f1 is a focal length of the first lens group and f3 is a focal length of the third lens group.

24. The method of manufacturing a zoom optical system according to claim 20, wherein upon zooming from a wide-angle end state to a telephoto end state, a distance between the first lens group and the second lens group increases, a distance between the second lens group and the third lens group decreases, a distance between the third lens group and the fourth lens group increases, and a distance between the fourth lens group and the fifth lens group decreases.

25. The method of manufacturing a zoom optical system according to claim 20, wherein upon zooming from a wide-angle end state to a telephoto end state, the first lens group, the third lens group, and the fifth lens group move in a direction toward an object, and wherein a moving distance of the third lens group and a moving distance of the fifth lens group are equal.

26. The method of manufacturing a zoom optical system according to claim 20,
wherein at least one surface of a lens in the second lens group is formed in an aspherical shape.

27. A method of manufacturing a zoom optical system, comprising the steps of:
arranging a first lens group having a positive refracting power, a second lens group having a negative refracting power, a third lens group having a positive refracting power, a fourth lens group having a negative refracting power, and a fifth lens group having a positive refracting power, in the order from an object side; and
moving at least a part of the fourth lens group in a direction orthogonal to an optical axis,
wherein a condition of the following expression is satisfied:

$$1.0 < f4/f2 < 3.0,$$

where f2 is a focal length of the second lens group and f4 is a focal length of the fourth lens group, and
wherein the fourth lens group has a cemented lens of a negative lens and a positive lens in the order from the object side.

28. The method of manufacturing a zoom optical system according to claim 27, wherein only the cemented lens is moved in a direction orthogonal to an optical axis.

29. The method of manufacturing a zoom optical system according to claim 27,
wherein a condition of the following expression is satisfied:

$$\nu p > 30.0,$$

where $\nu p$ is an Abbe number of the positive lens of the cemented lens.

30. The method of manufacturing a zoom optical system according to claim 27,
wherein a condition of the following expression is satisfied:

$$0.25 < Rs/(-f4) < 0.45,$$

where Rs is a radius of curvature of a cemented surface of the cemented lens and f4 is a focal length of the fourth lens group.

31. The method of manufacturing a zoom optical system according to claim 27,
wherein a condition of the following expression is satisfied:

$$0.07 < Np - Nn < 0.20,$$

where Np is a d-line refractive index of the positive lens of the cemented lens and Nn is a d-line refractive index of the negative lens of the cemented lens.

32. The method of manufacturing a zoom optical system according to claim 27,
wherein a condition of the following expression is satisfied:

$$15 < \nu n - \nu p < 27,$$

where $\nu p$ is an Abbe number of the positive lens of the cemented lens and $\nu n$ is an Abbe number of the negative lens of the cemented lens.

33. The method of manufacturing a zoom optical system according to claim 27,
wherein the cemented lens is comprised of a cemented lens of a biconcave lens and a positive meniscus lens with a convex surface on the object side in the order from the object side.

* * * * *